US012795183B2

(12) United States Patent
Pressnell et al.

(10) Patent No.: US 12,795,183 B2
(45) Date of Patent: Nov. 10, 2026

(54) MEDIA STREAMING SYSTEMS AND METHODS WITH A PREFETCHING FUNCTION

(71) Applicant: Penthera Partners, Inc., New York, NY (US)

(72) Inventors: Joshua Pressnell, Spring Valley, OH (US); Scott Halpert, Santa Monica, CA (US)

(73) Assignee: PENTHERA PARTNERS, INC., New York, NY (US)

(*) Notice: Subject to any disclaimer, the term of this patent is extended or adjusted under 35 U.S.C. 154(b) by 0 days.

(21) Appl. No.: 18/663,993

(22) Filed: May 14, 2024

(65) Prior Publication Data

US 2025/0267320 A1 Aug. 21, 2025

Related U.S. Application Data

(60) Provisional application No. 63/554,573, filed on Feb. 16, 2024.

(51) Int. Cl.
*H04N 21/234* (2011.01)
*H04N 21/239* (2011.01)
(Continued)

(52) U.S. Cl.
CPC ... *H04N 21/23424* (2013.01); *H04N 21/2393* (2013.01); *H04N 21/26258* (2013.01); *H04N 21/812* (2013.01)

(58) Field of Classification Search
CPC ......... H04N 21/23424; H04N 21/2393; H04N 21/26258; H04N 21/812
(Continued)

(56) References Cited

U.S. PATENT DOCUMENTS 8,977,704 B2 * 3/2015 Liu ....................... H04L 65/765 709/213
9,066,115 B1 6/2015 Cherry
(Continued)

FOREIGN PATENT DOCUMENTS

KR 20160138044 12/2016
WO 2022235670 A1 11/2022

OTHER PUBLICATIONS

Seeliger, R., et al., "Dynamic ad-insertion and content orchestration workflows through manifest manipulation in HLS and MPEG-DASH," 2017 IEEE Conference on Communications and Network Security (CNS), Las Vegas, NV, USA, 2017, pp. 450-455.
(Continued)

*Primary Examiner* — Nasser M Goodarzi
(74) *Attorney, Agent, or Firm* — Rothwell, Figg, Ernst & Manbeck, P.C.

(57) ABSTRACT

A method that includes providing to a player a manifest that comprises a segment identifier for identifying a segment of first media content or template information for generating the segment identifier. The method also includes receiving a segment request comprising the segment identifier and, in response to receiving the segment request: i) providing to the player a response message responsive to the segment request; and ii) performing a first process for enabling the player to obtain second media content to be played by the player during a break in the first media content. The first process for enabling the player to obtain the second media content comprises transmitting to a PF a prefetch request for triggering the PF to send to an ad server a metadata request. The ad server responds to the request by providing to the PF metadata for the second media content.

13 Claims, 12 Drawing Sheets

(51) Int. Cl.
*H04N 21/262* (2011.01)
*H04N 21/81* (2011.01)

(58) Field of Classification Search
USPC ........................................................ 725/32
See application file for complete search history.

(56) References Cited

U.S. PATENT DOCUMENTS

| | | | | |
|---|---|---|---|---|
| 10,217,138 | B1 | 2/2019 | Mills et al. | |
| 10,904,639 | B1 | 1/2021 | Benson et al. | |
| 11,336,506 | B1 | 5/2022 | Li | |
| 11,438,675 | B1 * | 9/2022 | Pressnell | H04N 21/812 |
| 11,653,075 | B2 | 5/2023 | Pressnell | |
| 11,659,259 | B1 | 5/2023 | Pressnell | |
| 12,075,137 | B2 | 8/2024 | Pressnell | |
| 12,096,096 | B2 | 9/2024 | Pressnell | |
| 2010/0030645 | A1 | 2/2010 | Watanuki | |
| 2010/0205049 | A1 | 8/2010 | Long | |
| 2011/0185043 | A1 | 7/2011 | Zeller et al. | |
| 2012/0198492 | A1 | 8/2012 | Dhruv et al. | |
| 2012/0290644 | A1 | 11/2012 | Gabin et al. | |
| 2013/0198328 | A1 | 8/2013 | Green | |
| 2014/0025836 | A1 | 1/2014 | Gupta | |
| 2014/0040026 | A1 * | 2/2014 | Swaminathan | G06Q 30/00 705/14.66 |
| 2014/0149210 | A1 | 5/2014 | Ma et al. | |
| 2014/0150019 | A1 | 5/2014 | Ma | |
| 2014/0281010 | A1 | 9/2014 | Pange | |
| 2014/0365491 | A1 | 12/2014 | Macaulay et al. | |
| 2014/0365675 | A1 | 12/2014 | Bhardwaj | |
| 2015/0067722 | A1 | 3/2015 | Bjordammen | |
| 2015/0081851 | A1 | 3/2015 | Oyman et al. | |
| 2015/0150019 | A1 * | 5/2015 | Sheaffer | G06F 9/5088 718/104 |
| 2015/0256641 | A1 | 9/2015 | Agarwal et al. | |
| 2015/0358688 | A1 | 12/2015 | Kummer | |
| 2015/0371280 | A1 | 12/2015 | Bjordammen | |
| 2016/0182923 | A1 | 6/2016 | Higgs | |
| 2016/0226942 | A1 | 8/2016 | Bhardwaj | |
| 2016/0316233 | A1 * | 10/2016 | Ghadi | H04N 21/4302 |
| 2017/0085933 | A1 | 3/2017 | Czeck, Jr. | |
| 2017/0188116 | A1 | 6/2017 | Major et al. | |
| 2017/0310722 | A1 * | 10/2017 | Chen | H04L 65/612 |
| 2017/0359628 | A1 | 12/2017 | Sachdev | |
| 2018/0027301 | A1 | 1/2018 | Deshpande | |
| 2018/0376177 | A1 | 12/2018 | Nugent | |
| 2019/0098344 | A1 | 3/2019 | Shanson | |
| 2019/0313135 | A1 | 10/2019 | Pathak | |
| 2019/0342356 | A1 | 11/2019 | Thomas et al. | |
| 2020/0077127 | A1 | 3/2020 | Morrow | |
| 2020/0128284 | A1 | 4/2020 | Parks | |
| 2020/0204834 | A1 | 6/2020 | Loheide | |
| 2020/0204861 | A1 | 6/2020 | Loheide | |
| 2020/0213645 | A1 | 7/2020 | Sodagar | |
| 2020/0221151 | A1 | 7/2020 | Hosur | |
| 2020/0275148 | A1 | 8/2020 | Stockhammer | |
| 2020/0412785 | A1 | 12/2020 | Loheide | |
| 2020/0413117 | A1 | 12/2020 | Loheide et al. | |
| 2021/0044844 | A1 | 2/2021 | Mack | |
| 2021/0092467 | A1 | 3/2021 | Schwimmer et al. | |
| 2021/0152896 | A1 | 5/2021 | Fisher | |
| 2021/0168416 | A1 | 6/2021 | Weiner et al. | |
| 2021/0211748 | A1 | 7/2021 | Terem | |
| 2021/0368221 | A1 | 11/2021 | Loheide | |
| 2021/0392393 | A1 | 12/2021 | Olsson | |
| 2022/0132186 | A1 | 4/2022 | Sakai | |
| 2022/0264177 | A1 | 8/2022 | Cava | |
| 2022/0286739 | A1 | 9/2022 | Ganjam | |
| 2022/0368967 | A1 | 11/2022 | Loheide | |
| 2023/0034983 | A1 | 2/2023 | Weiner | |
| 2023/0069253 | A1 | 3/2023 | Pressnell et al. | |
| 2023/0269426 | A1 | 8/2023 | Mills | |
| 2023/0370665 | A1 | 11/2023 | Webb | |
| 2023/0370698 | A1 | 11/2023 | Pressnell et al. | |
| 2023/0370699 | A1 | 11/2023 | Pressnell | |
| 2023/0419368 | A1 | 12/2023 | Maalej | |
| 2025/0063240 | A1 | 2/2025 | Pressnell | |
| 2025/0104690 | A1 | 3/2025 | La Camera | |
| 2025/0240468 | A1 | 7/2025 | Loheide et al. | |
| 2025/0317608 | A1 | 10/2025 | Hou | |
| 2025/0386083 | A1 | 12/2025 | Pressnell | |

OTHER PUBLICATIONS

International Search Report and Written Opinion issued in International Application No. PCT/US24/36532 dated Sep. 23, 2024 (14 pages).

Non-Final Office Action issued on Feb. 27, 2025 in U.S. Appl. No. 18/226,581 (21 pages).

International Search Report and Written Opinion issued in International Application No. PCT/US2025/014469 dated Jul. 3, 2025 (19 pages).

Extended European Search Report issued in corresponding European Patent Application No. 23801678.6 dated Mar. 30, 2026 (9 pages).

International Search Report and Written Opinion issued in International Patent Application No. PCT/US2025/046333 dated Mar. 20, 2026 (18 pages).

Allowed Claims in U.S. Appl. No. 18/816,895 (Mar. 2026) (8 pages).

Non-Final Office Action issued on Dec. 17, 2025 in U.S. Appl. No. 18/889,773 (22 pages).

2 Non-Final Office Action issued on Aug. 27, 2025 in U.S. Appl. No. 18/816,895 (22 pages).

Notice of Allowance issued in U.S. Appl. No. 18/816,895 on Mar. 4, 2026 (12 pages).

International Search Report and Written Opinion issued in International Application No. PCT/US 23/20670 dated Jul. 21, 2023 (17 pages).

2nd Written Opinion issued in International Application No. PCT/US2023/020670 dated Mar. 19, 2024 (79 pages).

Office Action issued in India Patent App. No. 202417096958 on Dec. 29, 2025 (12 pages).

International Preliminary Report on Patentability issued in International Patent App. No. PCT/US2024/036532, on Jan. 20, 2026 (12 pages).

Invitation to Pay additional Fees and Partial International Search Report issued in International Patent App. No. PCT/US2025/046333 on Dec. 18, 2026 (13 pages).

Non-Final Office Action issued in U.S. Appl. No. 18/816,895 on Jun. 26, 2026 (14 pages).

Non-Final Office Action issued in U.S. Appl. No. 19/214,311 on Jul. 1, 2026 (20 pages).

Final Office Action issued in U.S. Appl. No. 18/889,773 on Jul. 7, 2026 (53 pages).

Apple Inc, "Apple Getting Started With HLS Interstitials," version 1.0b3, May 12, 2021 (11 pages).

Vasconcelos, J., et al., "Support for HLS Interstitials in AWS Elemental MediaTailor," AWS for M&E Blog, Apr. 25, 2024 (15 pages).

Screen Shots and Transcript of a video published by Apple Inc. titled "Explore dynamic mid-rolls and pre-rolls in HLS," available at https://developer.apple.com/videos/play/wwdc2021/10140/ (Jun. 2021) (14 pages).

Pantos, R., "HLS Interstitials," Apple Inc. (2021) (16 pages).

Pantos, R., "HTTP Live Streaming 2nd Edition draft-pantos-hls-rfc8216bis-10," Internet-Draft, Nov. 2021 (96 pages).

* cited by examiner

MEDIA STREAMING SYSTEMS AND METHODS WITH A PREFETCHING FUNCTION

CROSS-REFERENCE TO RELATED APPLICATIONS

This application claims the benefit of U.S. Provisional Patent Application No. 63/554,573, filed on 2024 Feb. 16, which is incorporated by this reference.

TECHNICAL FIELD

Disclosed are embodiments related to media (e.g., video and/or audio) streaming systems and methods.

BACKGROUND

Technology for streaming media content (e.g., video content and/or audio content) to a user is well established. Most streaming technologies, including Hypertext Transfer Protocol (HTTP) Live Streaming (HLS), a technology developed by Apple, Inc., and MPEG-Dynamic Adaptive Streaming over HTTP (DASH), work by dividing a media item (e.g., a 30 minute episode of a TV show) into many segments (e.g., 300 six-second segments) and providing to the player a segment manifest (e.g., an HLS playlist or an MPEG-DASH Media Presentation Description (MPD) or other information element that contains segment locator information) that enables the player to send to a server a request for each segment. Thus, for example, when a user wants to consume (e.g., watch and/or listen to) a particular media item, the user's media player may make a request to a server for a particular segment manifest (or manifest for short) for the media item (e.g., an HLS manifest or MPD), and, then, after obtaining the requested manifest, serially request the segments identified in the manifest (e.g., for each segment of the media item, the manifest may contain a Uniform Resource Locator (URL) that identifies the filename of the file that stores the segment and the location of the file on the Internet and/or segment template information that enables the player to determine the filenames and file locations).

After a player requests a manifest and before the manifest is provided to player, a process may select media to be inserted (e.g., a set of one or more ads) for an identified break (e.g., using an HLS playlist, the location of the break and its duration can be specified using the #EXT-X-CUE-OUT and #EXT-X-CUE-IN tags) and then insert into the manifest at the break position information for identifying segments of the selected media to be inserted (e.g., a set of ad segment URLs). In this way, selected media can be inserted into a media item at a predefined break.

For example, Table 1A below illustrates an example HLS playlist as it exists on the playlist server and Table 1B below illustrates a modified version of the HLS playlist shown in Table 1A which is provided to the player. A comparison of the two tables shows that five segment URLs have been inserted into the playlist.

TABLE 1A

```
#EXTM3U
#EXT-X-PLAYLIST-TYPE:VOD
#EXT-X-TARGETDURATION:6
#EXT-X-MEDIA-SEQUENCE:0
#EXTINF:6.0
```

TABLE 1A-continued

```
http://cdn.com/vid-seg1.ts
#EXTINF:6.0
http://cdn.com/vid-seg2.ts
#EXT-X-CUE-OUT: 30.00
#EXT-X-CUE-IN:
#EXTINF:6.0
http://cdn.com/vid-seg3.ts
```

TABLE 1B

```
#EXTM3U
#EXT-X-PLAYLIST-TYPE:VOD
#EXT-X-TARGETDURATION:6
#EXT-X-MEDIA-SEQUENCE:0
#EXTINF:6.0
http://cdn.com/vid-seg1.ts
#EXTINF:6.0
http://cdn.com/vid-seg2.ts
#EXT-X-DISCONTINUITY
#EXTINF:6.0
http://adserver.com/Ad-seg1.ts
#EXTINF:6.0
http://adserver.com/Ad-seg2.ts
#EXTINF:6.0
http://adserver.com/Ad-seg3.ts
#EXTINF:6.0
http://adserver.com/Ad-seg4.ts
#EXTINF:6.0
http://adserver.com/Ad-seg5.ts
#EXT-X-DISCONTINUITY
#EXTINF:6.0
http://cdn.com/vid-seg3.ts
```

As another example, Table 2A below illustrates an example MPEG-DASH MPD as it exists on the manifest server and Table 2B below illustrates a modified version of the manifest shown in Table 2A, which is provided to the player. A comparison of tables 2A and 2B shows that a period element corresponding to a break and containing five ad segment URLs has been inserted into the manifest between a first period element containing a first subset of the segment URLs from the period element in the original manifest and a third period containing a second subset of the segment URLs from the period element in the original manifest.

TABLE 2A

```
<MPD ...>
<Period...>
  <AdaptationSet mimeType="video/mp4" ...>
    <Representation id="rep1" bandwidth="10392000" ...>
      <SegmentList ...>
        <SegmentURL media="http://cdn.com/vid-rep1-seg1.mp4"/>
        <SegmentURL media="http://cdn.com/vid-rep1-seg2.mp4"/>
        <SegmentURL media="http://cdn.com/vid-rep1-seg3.mp4"/>
        <SegmentURL media="http://cdn.com/vid-rep1-seg4.mp4"/>
        <SegmentURL media="http://cdn.com/vid-rep1-seg5.mp4"/>
        <SegmentURL media="http://cdn.com/vid-rep1-seg6.mp4"/>
        <SegmentURL media="http://cdn.com/vid-rep1-seg7.mp4"/>
        <SegmentURL media="http://cdn.com/vid-rep1-seg8.mp4"/>
        <SegmentURL media="http://cdn.com/vid-rep1-seg9.mp4"/>
        <SegmentURL media="http://cdn.com/vid-rep1-seg10.mp4"/>
        <SegmentURL media="http://cdn.com/vid-rep1-seg11.mp4"/>
        <Initialization sourceURL="http://cdn.com/init1.mp4"/>
      </SegmentList>
    </Representation>
  </AdaptationSet>
</Period>
```

TABLE 2B

```
<MPD ...>
<Period id="1" ...>
  <AdaptationSet mimeType="video/mp4" ...>
    <Representation bandwidth="10392000" ...>
      <SegmentList ...>
        <SegmentURL media="http://cdn.com/vid-rep1-seg1.mp4"/>
        <SegmentURL media="http://cdn.com/vid-rep1-seg2.mp4"/>
        <SegmentURL media="http://cdn.com/vid-rep1-seg3.mp4"/>
        <SegmentURL media="http://cdn.com/vid-rep1-seg4.mp4"/>
        <SegmentURL media="http://cdn.com/vid-rep1-seg5.mp4"/>
        <SegmentURL media="http://cdn.com/vid-rep1-seg6.mp4"/>
        <SegmentURL media="http://cdn.com/vid-rep1-seg7.mp4"/>
        <Initialization sourceURL="http://cdn.com/init1.mp4"/>
      </SegmentList>
    </Representation>
  </AdaptationSet>
</Period>
<Period id="ad__break__1"...> /*This period is for the break **/
 <AdaptationSet mimeType="video/mp4" ...>
    <Representation bandwidth="10392000" ...>
      <SegmentList ...>
        <SegmentURL media="http://adserver.com/Ad-rep1-seg1.mp4"/>
        <SegmentURL media="http://adserver.com/Ad-rep1-seg2.mp4"/>
        <SegmentURL media="http://adserver.com/Ad-rep1-seg3.mp4"/>
        <SegmentURL media="http://adserver.com/Ad-rep1-seg4.mp4"/>
        <SegmentURL media="http://adserver.com/Ad-rep1-seg5.mp4"/>
        <Initialization sourceURL="http://adserver.com/init.mp4"/>
      </SegmentList>
    </Representation>
  </AdaptationSet>
</Period>
<Period id="2"...>
 <AdaptationSet mimeType="video/mp4" ...>
    <Representation bandwidth="10392000" ...>
      <SegmentList ...>
        <SegmentURL media="http://cdn.com/vid-rep1-seg8.mp4"/>
        <SegmentURL media="http://cdn.com/vid-rep1-seg9.mp4"/>
        <SegmentURL media="http://cdn.com/vid-rep1-seg10.mp4"/>
        <SegmentURL media="http://cdn.com/vid-rep1-seg11.mp4"/>
        <Initialization sourceURL="http://cdn.com/init1.mp4"/>
      </SegmentList>
    </Representation>
  </AdaptationSet>
</Period>
</mpd>
```

SUMMARY

Certain challenges presently exist. For instance, due to the nature of server side ad-insertion (SSAI), the timeout in the request from an ad stitcher to the ad server is typically set at a maximum of 3 seconds, and, based on observations and market research, this short timeout period causes a significant loss in ads delivered during peak hours.

Accordingly, in one aspect there is provided a method that overcomes this timing issue. In one embodiment, the method includes providing a manifest to a player, wherein the manifest comprises a segment identifier for identifying a segment of first media content (e.g., a segment of an episode of show or a segment of a move) or template information for generating the segment identifier. The method also includes receiving, from the player, a first segment request comprising the segment identifier for identifying the segment of first media content. The method also includes, in response to receiving the first segment request: i) providing to the player a first response message responsive to the first segment request; and ii) performing a first process for enabling the player to obtain second media content to be played by the player during a break in the first media content. The first process for enabling the player to obtain the second media content comprises transmitting to a prefetching function (PF) a prefetch request for triggering the PF to send to an ad server a metadata request, wherein the ad server responds to the metadata request by providing to the PF metadata for the second media content.

In another embodiment, the method includes receiving a first segment request from a player. The method also includes, in response to receiving the first segment request: i) transmitting a first response to the player, wherein the first response includes a first segment of first media content or a first segment identifier for enabling the player to retrieve the first segment of the first media content; and ii) transmitting to a prefetching function (PF) a prefetch request comprising a stream identifier. The method also includes receiving a second segment request from the player. The method further includes, in response to receiving the second segment request: i) transmitting a second response to the player, wherein the second response includes a second segment of the first media content or a second segment identifier for enabling the player to retrieve the second segment of the first media content; and ii) performing a process for obtaining segment locator information for use in retrieving segments of second media content.

In another embodiment, the method includes receiving a first segment request from a player. The method also includes, in response to receiving the first segment request: i) transmitting a first response to the player, wherein the first response includes a first segment of first media content or a first segment identifier for enabling the player to retrieve the first segment of the first media content; and ii) transmitting to an ad server a first metadata request. The method also includes receiving from the ad server a first metadata response responsive to the first metadata request, wherein the first metadata response comprises metadata for second media content. The method also includes caching the metadata. The method also includes receiving a second segment request from the player. The method further includes in response to receiving the second segment request: i) transmitting a second response to the player, wherein the second response includes a second segment of the first media content or a second segment identifier for enabling the player to retrieve the second segment of the first media content; and ii) performing a process for obtaining segment locator information for use in retrieving segments of the second media content.

In another aspect there is provided a computer program comprising instructions which when executed by processing circuitry of an apparatus causes the apparatus to perform any of the methods disclosed herein. In one embodiment, there is provided a carrier containing the computer program wherein the carrier is one of an electronic signal, an optical signal, a radio signal, and a computer readable storage medium. In another aspect there is provided an apparatus that is configured to perform the methods disclosed herein. The apparatus may include memory and processing circuitry coupled to the memory.

An advantage of the embodiments disclosed herein is that they enable the selection of an ad set after a manifest has already been provided to the media player.

BRIEF DESCRIPTION OF THE DRAWINGS

The accompanying drawings, which are incorporated herein and form part of the specification, illustrate various embodiments.

DETAILED DESCRIPTION

Figure 1:
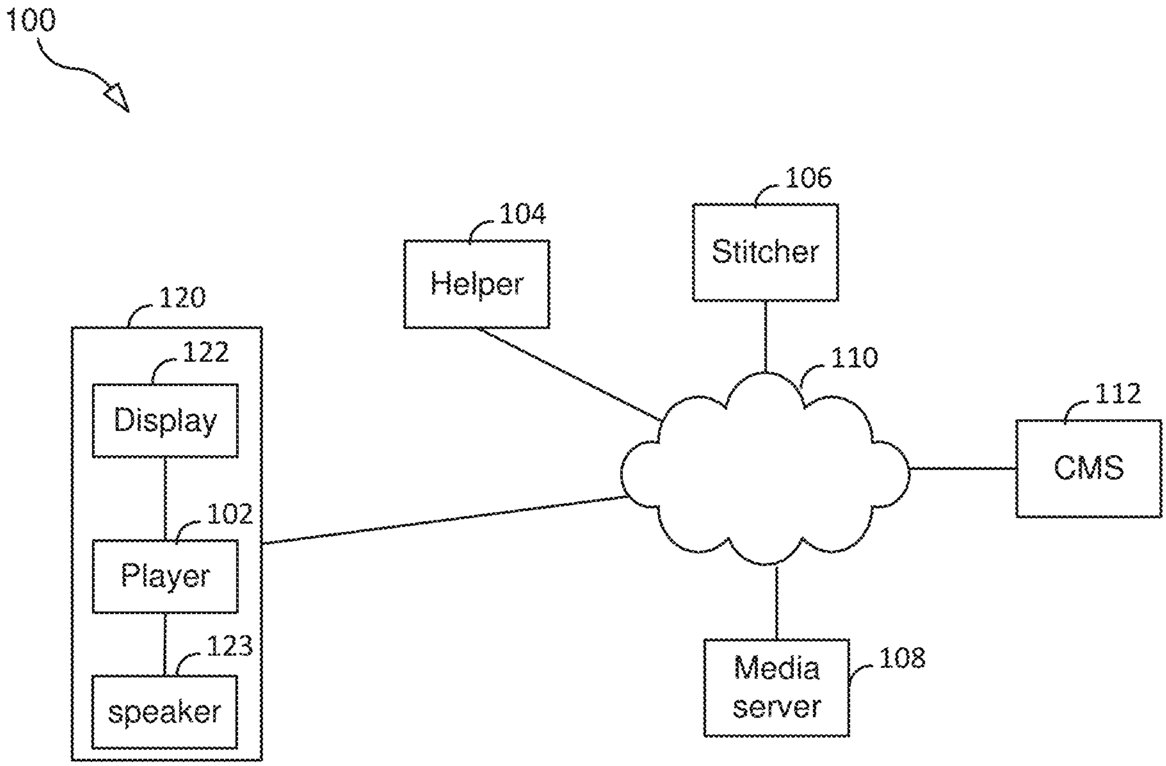
FIG. 1 illustrates a system according to an embodiment.

FIG. 1 illustrates a system 100 according to an embodiment. System 100 includes a player 102, a proxy 104 (a.k.a., helper 104), a stitcher 106 (e.g., an ad stitcher or news bulletin stitcher etc.), a media server 108, and a content serving system (CSS) 112 (e.g., a Content Data Network (CDN). Typically, the player 104 is a computer program that runs on a device 120 (e.g., mobile phone, smart TV, computer, etc.) having a display screen 122 for displaying decoded video frames and a speaker 123 for playing decoded audio frames. While helper 104 is illustrated as being remote from device 102, in some embodiments, helper is a computer program that also runs on device 120. Likewise, in some embodiments, helper 104 runs on a computer that is a component of CSS 112. Similarly, while helper 104 is shown as being separate from stitcher 106, helper 104 and stitcher 106 may be combined.

Figure 2:
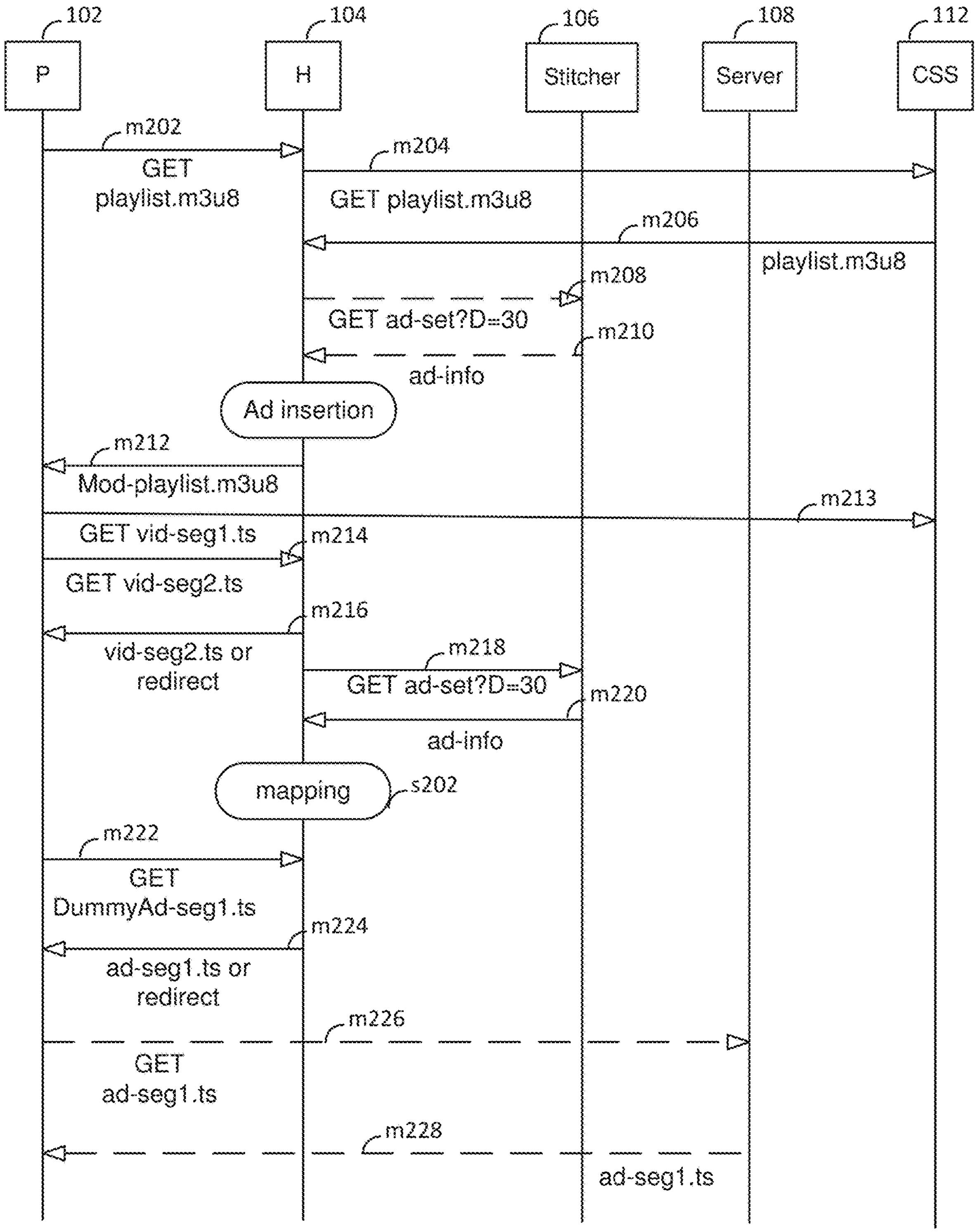
FIG. 2 is a message flow diagram according to an embodiment.

FIG. 2 is a message flow diagram illustrating a process according to an embodiment. The process may begin with player 102 sending a request message m202 (e.g. HTTP GET message) identifying a manifest (e.g., playlist.m3u8). Request message m202 is received at helper 104.

In response to receiving request message m202, helper 104 sends to CSS 112 a request message m204 identifying the manifest. In response to receiving message m204, CSS 112 sends to helper 104 a response message m206 comprising the requested manifest.

In some embodiments, after receiving the requested manifest, helper 104 sends to stitcher 106 a request message m208 identifying a content break duration (e.g., 30 seconds) and requesting a media set for the content break (for ease of explanation, assume that the media set is an ad set and the break is an ad break). Stitcher 106 responds to the request message by transmitting to helper a response message m210 that comprises ad information or an indication that no ads are available. The ad information may identify one or more ads and, for each identified ad, may include a set of ad segment URLs for the ad. For example, the ad information may indicate that a single 15 second ad was selected and may contain 3 ad segment URLs for this 15 second ad (e.g., adserver.com/ad-seg1.ts, adserver.com/ad-seg2.ts, adserver.com/ad-seg3.ts).

For each ad break identified in the manifest, helper 104 performs an ad break placeholder insertion process that, in at least one embodiment, comprises: i) determining the duration of the ad break; ii) determining ad set information based on (e.g., based solely on) the duration of the ad break; and iii) inserting into the manifest at the location of the ad break the determined ad set information (or information derived therefrom), which information includes segment locator information (e.g., a set of URLs). After inserting the information including the segment locator information into the manifest, thereby producing a modified manifest, helper 104 provides to player 102 response message m212, which contains the modified manifest.

In one embodiment, helper 104 has a lookup table that maps (directly or indirectly) each possible ad break duration to corresponding ad set information. Accordingly, in one embodiment the step of determining the ad set information to insert into the manifest based on (e.g., based solely on) the duration of the ad break comprises using the lookup table to determine the ad set information that is associated with the ad break duration. It is this determined ad set information (or information derived therefrom) that can be inserted into the manifest.

An example lookup table is shown below Table 3.

TABLE 3

| Ad Break Duration | Ad Set Information |
|---|---|
| 30 seconds | http://helper.com/DummyAd-seg1.ts<br>http://helper.com/DummyAd-seg2.ts<br>http://helper.com/DummyAd-seg3.ts<br>#PEB<br>http://helper.com/DummyAd-seg4.ts<br>http://helper.com/DummyAd-seg5.ts<br>#PEB<br>http://helper.com/DummyAd-seg6.ts |
| 60 seconds | http://helper.com/DummyAd-seg1.ts<br>http://helper.com/DummyAd-seg2.ts<br>http://helper.com/DummyAd-seg3.ts<br>#PEB<br>http://helper.com/DummyAd-seg4.ts<br>http://helper.com/DummyAd-seg5.ts<br>#PEB<br>http://helper.com/DummyAd-seg6.ts<br>#PEB<br>http://helper.com/DummyAd-seg7.ts<br>http://helper.com/DummyAd-seg8.ts<br>#PEB<br>http://helper.com/DummyAd-seg9.ts<br>#PEB<br>http://helper.com/DummyAd-seg10.ts<br>#PEB<br>http://helper.com/DummyAd-seg11.ts<br>#PEB<br>http://helper.com/DummyAd-seg12.ts |
| . . . | |

While each URL included in Table 3 is a unique URL (i.e. is different in some way for each other URL), this is not a requirement. For example, each URL included in table 3 could simply be: "helper.com/DummyAd-seg" or even "DummyAd-seg." The same information shown above can also be stored more efficiently as shown in Table 4 below:

TABLE 4

| Ad Break Duration | Data from which Ad Set Information to be inserted can be derived |
|---|---|
| 30 seconds | Max Number of Possible Ad Segments (Max_num) = 6<br>PEB locations = (3, 5) |
| 60 seconds | Max Number of Possible Ad Segments (Max_num) = 12<br>PEB locations = (3, 5, 6, 8, 9, 11) |
| .<br>.<br>. | |

As illustrated above, in one embodiment the ad set information associated with an ad break duration not only includes a value that specifies the maximum number of possible ad segments required for the ad set, but also an array that specifies all potential encoding breaks (PEBs) for the ad break.

Determining the Maximum Number of Possible Ad Segments:

In one embodiment, to create Table 3 or Table 4, for each possible ad break duration, the maximum number of possible ad segments (Max_num) must be determined. To determine Max_num for a particular ad break duration, one must determine: 1) the set of possible ad sets for that ad break duration and 2) for each such possible ad set, the number of segments required by that ad set. Max_num is then defined as: Max_num=max ($S_1$, $S_2$, . . . , $S_N$), where N is the number of possible ad sets for the given ad break duration and $S_i$ for i=1 to N is the number of segments required by the $i^{th}$ possible ad set for the given ad break duration.

As a specific example, given a 30 second ad break duration and given that ads come in only two flavors (15 second ad or 30 second ad), one can deduce the set of possible ad sets for the 30 second ad break. Specifically, for this example, there are two possible ad sets that can fit within the 30 second ad break (i.e., N=2): i) a 30 second ad and ii) a two consecutive 15 second ads.

As another specific example, given a 60 second ad break duration and given that ads come in only two flavors (15 second ad or 30 second ad), one can deduce the set of possible ad sets for the 60 second ad break. Specifically, for this example, there are six possible ad sets that can fit within the 60 second ad break (i.e., N=6): i) a 60 second ad, ii) two consecutive 30 second ads, iii) a 30 second ad followed by two 15 second ads, iv) two 15 seconds followed by a 30 second ad, and v) a 15 second ad followed by a 30 second ad followed by a 15 second ad, and vi) four consecutive 15 second ads.

The value $S_i$ is equal to sum ($S_{i1}$, $S_{i2}$, . . . , $S_{iM}$), wherein M is the number of ads within the ith possible ad set and $s_{ij}$ is number of segments required by the jth ad within the ith ad set. The value $s_{ij}$ is dependent on two values: 1) the duration of the ad and 2) a segment duration. More specifically, $S_{ij}$=Ceiling ((Dur of $ad_{ij}$)/(Seg_Dur)). In one embodiment, Seg_Dur is equal to 6 seconds. According, if an ad is 15 seconds, the number of segments required for that ad is: Ceiling (15/6)=Ceiling (2.5)=3. Hence, given Seg_Dur=6, an ad set that consists of two 15 second ads requires 3+3=6 segments; likewise, an ad set that consists of four 15 second ads requires 3× 4=12 segments.

Determining the Locations of Potential Encoding Breaks (PEBs)

Every possible ad set associated with a given ad break is associated with a set of encoding breaks. Accordingly, to determine all of the potential encoding breaks (PEBs) for the given ad break, one forms the union of these sets. For example, two ad sets are associated with the 30 second ad break: a first ad set consisting of a 30 second ad and a second ad set consisting of two consecutive 15 second ads. Given Seg_Dur=6, the first ad set requires only 5 segments, but Max_num for this ad break is 6 segments; hence, for the first ad set there is an encoding break located at segment 5 (or alternatively an encoding break located at segment 1). The second ad set requires 3 segments for the first 15 second ad and 3 segments for the second 15 second ad; hence for the second ad set there is an encoding break located at segment 3. Accordingly, the PEB locations for the 30 second ad break are: 3 and 5 (or 1 and 3).

As another example, given an ad break of 60 seconds and Seg_Dur=6 seconds, then there is the potential to have 10-12 ad segments in that break. In the case of HLS, that means that discontinuity tags need to be placed just before the first ad segment, just after the last ad segment, and anywhere within the 10-12 ad segments that an ad switches to a different ad or to a black segment. For example, give two 30 second ads, in one embodiment, the segments are arranged as follows: (Aij=Ad segment i for Ad j, P=Placeholder Segment):

A11-A12-A13-A14-A15-B-A21-A22-A23-A24-A25-B, so that there are encoding breaks at location 5, 6, and 11.

As another example, given two 15 second ads and a 30 second ad, in one embodiment the segments are arranged as:

A11-A12-A13-A21-A22-A23-A31-A32-A33-A34-A35-P, so that there are encoding breaks at location 3, 6, and 11.

As another example, given four 15 second ads, in one embodiment the segments are arranged as:

A11-A12-A13-A21-A22-A23-A31-A32-A33-A41-A42-A43, so that there are encoding breaks at location 3, 6, and 9.

Thus, a final structure that would support all 3 of these segment breakouts would be (where S=generic segment placeholder, and PEB indicates an potential encoding break):

S-S-S-PEB-S-S-PEB-S-PEB-S-S-S-PEB-S-S-PEB-S.

Hence, for this example the PEB array corresponding to the 60 second ad break could be: PEB=(3, 5, 6, 9, 11). As is known in the art, there is an encoding break just prior to the beginning of the ad break and another encoding break at the end of the ad break.

In some embodiments, rather than determining all of the potential encoding breaks, helper 104 simply assumes there is an encoding break after each segment, leading to the following structure:

S-PEB-S-PEB-S-PEB-S-PEB-S-PEB-S-PEB-S-PEB-S-PEB-S-PEB-S-PEB-S-PEB-S.

Hence, for this example the PEB array corresponding to the 60 second ad break could be: PEB=(1, 2, 3, 4, 5, 6, 7, 8, 9, 10, 11).

Inserting Ad Set Information into the Manifest

As noted above, in one embodiment helper 104 inserts into the manifest at the location of the ad break the determined ad set information (or, for example, segment locator information derived therefrom). Here will provide a specific example using an HLS playlist, but this disclosure also applies to other protocols, such as, for example, MPEG-DASH. For this example, the playlist shown in Table 1A is the playlist helper 104 received in response to its manifest request. For this example, we will also assume that the ad set information corresponding to the 30 second ad break identified in the playlist shown in Table 1A is the same ad set information corresponding to the 30 second ad break shown in Table 4. That is, in this example, the ad set information has Max_num=6 and PEB locations=(3, 5). Given this ad set information, helper may produce a modified playlist as shown in Table 5.

TABLE 5

```
#EXTM3U
#EXT-X-PLAYLIST-TYPE:VOD
#EXT-X-TARGETDURATION:6
#EXT-X-MEDIA-SEQUENCE:0
#EXTINF:6.0
http://helper.com/vid-seg1.ts
#EXTINF:6.0
http://helper.com/vid-seg2.ts
#EXT-X-DISCONTINUITY
#EXTINF:6.0
http://helper.com/DummyAd-seg1.ts
#EXTINF:6.0
http://helper.com/DummyAd-seg2.ts
#EXTINF:6.0
http://helper.com/DummyAd-seg3.ts
#EXT-X-DISCONTINUITY
#EXTINF:6.0
http://helper.com/DummyAd-seg4.ts
#EXTINF:6.0
http://helper.com/DummyAd-seg5.ts
#EXT-X-DISCONTINUITY
#EXTINF:3.0
http://helper.com/DummyAd-seg6.ts
#EXT-X-DISCONTINUITY
#EXTINF:6.0
http://helper.com/vid-seg3.ts
```

More specifically, because Max_num=6, helper will insert at the ad break (i.e., between vid-seg2 and vid-seg3) six placeholder (or 'dummy') URLs into the playlist. Also, because this is an HLS example, for each dummy URL there must be a preceding #EXTINF tag. Additionally, because PED=(3, 5), in addition to inserting an #EXT-X-DISCONTINUITY tag between vid-seg2 and DummyAd-seg1 and inserting an #EXT-X-DISCONTINUITY tag between DummyAd-seg5 and vid-seg3 (due to the known encoding breaks there), helper also inserts an #EXT-X-DISCONTINUITY tag between DummyAd-seg3 and DummyAd-seg4 and insert an #EXT-X-DISCONTINUITY tag between DummyAd-seg5 and DummyAd-seg6 because these are locations of the potential encoding breaks.

Additionally, as shown in the table above, in some embodiments, helper 104 may replace every string "cdn.com" with "helper.com" so that all of the content segment requests in addition to the ad segment requests will be sent by player 102 to helper 104. In other embodiments (see e.g., Table 7), helper selectively replaces the string "cdn.com" with "helper.com" so that not all occurrences are changed. More generically, helper may modify the manifest so that at least some (i.e., all or less than all) segment requests are sent to the helper.

Additionally, in some embodiments, helper 104 will also append the following text to the playlist:

TABLE 6

```
#EXT-X-DISCONTINUITY
#EXTINF:1.0,
http://helper.com/AdditionalDummyAd-seg1.ts
#EXTINF:1.0,
http://helper.com/AdditionalDummyAd-seg2.ts
#EXTINF:1.0,
http://helper.com/AdditionalDummyAd-seg3.ts
#EXTINF:1.0,
http://helper.com/AdditionalDummyAd-seg4.ts
#EXTINF:1.0,
http://helper.com/AdditionalDummyAd-seg5.ts
#EXTINF:1.0,
http://helper.com/AdditionalDummyAd-seg6.ts
```

That is, in one embodiment, helper appends to the manifest a number of additional dummy URLs equal in number to the number dummy URLs added to the manifest. Additionally, as shown in Table 6 above, helper 104 may specify that the duration of each additional dummy segment is 1 second.

As noted above, in some embodiments helper 104 may send request m208 to stitcher 106 prior to performing the ad break placeholder insertion process. In this embodiment, helper 104 may be configured to modify the ad break placeholder insertion process so that instead of inserting all of the dummy URLs into the manifest it inserts less than all, depending on the response m210 from stitcher 106. For example, if the ad information included in response m210 indicates that a single 15 second ad was selected and contains 3 ad segment URLs for this 15 second ad (e.g., adserver.com/ad-seg1.ts, adserver.com/ad-seg2.ts, adserver.com/ad-seg3.ts), then the modified manifest produced by helper 104 may appear as shown in Table 7 below. Alternatively, all of the dummy URLs are inserted into the manifest as shown in Table 5 and helper maps the first three dummy URLs to the ad segment URLs received in response m210 (an example of such a mapping is shown in Tables 9 and 10, below).

TABLE 7

```
#EXTM3U
#EXT-X-PLAYLIST-TYPE:VOD
#EXT-X-TARGETDURATION:6
#EXT-X-MEDIA-SEQUENCE:0
#EXTINF:6.0
http://cdn.com/vid-seg1.ts
#EXTINF:6.0
http://helper.com/vid-seg2.ts
#EXT-X-DISCONTINUITY
#EXTINF:6.0
http://helper.com/ad-seg1.ts
#EXTINF:6.0
http://helper.com/ad-seg2.ts
#EXTINF:3.0
http://helper.com/ad-seg3.ts
#EXT-X-DISCONTINUITY
#EXTINF:6.0
http://helper.com/DummyAd-seg1.ts
#EXTINF:6.0
http://helper.com/DummyAd-seg2.ts
#EXT-X-DISCONTINUITY
#EXTINF:3.0
http://helper.com/DummyAd-seg3.ts
#EXT-X-DISCONTINUITY
#EXTINF:6.0
http://helper.com/vid-seg3.ts
```

As yet another example, if the ad information included in response m210 indicates that a single 30 second ad was selected and contains 5 ad segment URLs for this 30 second ad (e.g., adserver.com/ad-seg1.ts, adserver.com/ad-seg2.ts, adserver.com/ad-seg3.ts, adserver.com/ad-seg4.ts, adserver-.com/ad-seg5.ts), then the modified manifest produced by helper 104 may appear as shown in Table 8 below. Alternatively, all of the dummy URLs are inserted into the manifest as shown in Table 5 and helper maps five consecutive dummy URLs to the ad segment URLs received in response m210 (an example of such a mapping is shown in Tables 11 and 12, below).

TABLE 8

```
#EXTM3U
#EXT-X-PLAYLIST-TYPE:VOD
#EXT-X-TARGETDURATION:6
#EXT-X-MEDIA-SEQUENCE:0
#EXTINF:6.0
http://helper.com/vid-seg1.ts
#EXTINF:6.0
http://helper.com/vid-seg2.ts?trigger=1
#EXT-X-DISCONTINUITY
#EXTINF:6.0
http://helper.com/ad-seg1.ts
#EXTINF:6.0
http://helper.com/ad-seg2.ts
#EXTINF:6.0
http://helper.com/ad-seg3.ts
#EXTINF:6.0
http://helper.com/ad-seg4.ts
#EXTINF:6.0
http://helper.com/ad-seg5.ts
#EXT-X-DISCONTINUITY
#EXTINF:3.0
http://helper.com/DummyAd-seg1.ts
#EXT-X-DISCONTINUITY
#EXTINF:6.0
http://helper.com/vid-seg3.ts
```

Referring back to FIG. 2, after player 102 receives the modified manifest (e.g., the playlist shown in Table 5, Table 7 or Table 8), player 102 begins sending segment requests according to the manifest (e.g., requests for segments of the presentation, which is a video in this example). For example, as shown in FIG. 2, player 102 sends to CSS 112 a request message m213 for vid-seg1.ts and sends to helper 104 a request message m214 for vid-seg2.ts. CSS responds to request m213 in a conventional manner and helper 104 responds to request m214 by, at a minimum, providing to player 102 a response message m216, which either contains the requested segment (vid-seg2.ts) or a redirect message that causes player 102 to send a request message to a server (e.g. a server within CSS) for the segment.

At some point before player 102 requests the segment DummyAd-seg1.ts, or in response to receiving the request for segment DummyAd-seg1.ts (e.g., an HTTP GET request that includes a request target containing or consisting of the string "/DummyAd-set1.ts"), helper 104 transmits to stitcher 106 a request message m218 indicating that helper is requesting one or more ads (i.e. a set of ads) to fill a 30 second ad break.

For example, in one embodiment, in response to receiving request m214, the helper may: 1) send to the player response message m216 and 2) initiate the transmission of a request to stitcher 106 (e.g., determine whether a request to stitcher 106 is needed, and, if so, send to stitcher a request message m218 indicating that helper is requesting one or more ads (i.e. a set of ads) to fill an ad break). For instance, in one embodiment, the helper determines whether a request to stitcher 106 is needed by checking whether a flag is set to TRUE (e.g., equal to 1) and if the flag is set to TRUE, then it is determined that a request to stitcher 106 is needed. In another embodiment, the helper determines whether a request to stitcher 106 is needed by checking both whether the flag is set to TRUE and whether the request includes a trigger string (e.g., "trigger=1"), and if the flag is set to TRUE and request includes the trigger string, then it is determined that a request to stitcher 106 is needed. After sending the request, the flag is set to FALSE. The flag may be set back to TRUE after the ad break has finished.

Stitcher 106 responds to the request message m218 by transmitting to helper 104 a response message m220 that contains either segment location information for use in retrieving X ad segments (e.g., X ad segment URLs or template information specifying the X ad segment URLs) or X ad segments, where X is greater than or equal to zero. More specifically, assuming only two flavors of ads (15 second ads or 30 second ads) and a segment duration of 6 seconds, then X is one of: 0, 3, 5, or 6. If X is 3, this means stitcher has selected a single 15 second ad; if X is 5, this means stitcher has selected a single 30 second ad; if X is 6, this means stitcher selected two fifteen second ads.

If X is greater than zero, then helper 104 will perform a mapping step s202 that results in mapping X of the dummy URLs to a corresponding one of the X ad segment URLs. For example, assume that stitcher 106 returned X=3 ad segment URLs as follows: adserver.com/ad1-seg1.ts; adserver.com/ad1-seg2.ts; and adserver.com/ad1-seg3.ts. In this case, in performing mapping step s02, helper maps three consecutive dummy URLs to these ad segment URLs as shown in the table 9 or table 10 below as examples, whereas the other three dummy URLs that make up the ad break are either mapped to a short (e.g. 500 millisecond) placeholder segment (e.g., a segment that contains nothing but blank video frames or a segment that contains for example still video of a logo or a segment containing a house ad or branded slate any other video content to fill the time) or mapped to i) ad segment URLs received in response message m210 and/or ii) ad segment URLs corresponding to ad segments received in response message m210.

TABLE 9

| | |
|---|---|
| http://helper.com/DummyAd-seg1.ts | adserver.com/ad1-seg1.ts |
| http://helper.com/DummyAd-seg2.ts | adserver.com/ad1-seg2.ts |
| http://helper.com/DummyAd-seg3.ts | adserver.com/ad1-seg3.ts |
| http://helper.com/DummyAd-seg4.ts | placeholder_seg.ts |
| http://helper.com/DummyAd-seg5.ts | placeholder_seg.ts |
| http://helper.com/DummyAd-seg6.ts | placeholder_seg.ts |

TABLE 10

| | |
|---|---|
| http://helper.com/DummyAd-seg1.ts | placeholder_seg.ts |
| http://helper.com/DummyAd-seg2.ts | placeholder_seg.ts |
| http://helper.com/DummyAd-seg3.ts | placeholder_seg.ts |
| http://helper.com/DummyAd-seg4.ts | adserver.com/ad1-seg1.ts |
| http://helper.com/DummyAd-seg5.ts | adserver.com/ad1-seg2.ts |
| http://helper.com/DummyAd-seg6.ts | adserver.com/ad1-seg3.ts |

As another example, assume that stitcher 106 returned X=5 ad segment URLs as follows: adserver.com/ad1-seg1.ts; adserver.com/ad1-seg2.ts; adserver.com/ad1-seg3.ts; adserver.com/ad1-seg4.ts; and; adserver.com/ad1-seg5.ts. In this case, helper will map five consecutive dummy URLs to these ad segment URLs as shown in Table 11 or Table 12 below.

TABLE 11

| | |
|---|---|
| http://helper.com/DummyAd-seg1.ts | adserver.com/ad1-seg1.ts |
| http://helper.com/DummyAd-seg2.ts | adserver.com/ad1-seg2.ts |
| http://helper.com/DummyAd-seg3.ts | adserver.com/ad1-seg3.ts |
| http://helper.com/DummyAd-seg4.ts | adserver.com/ad1-seg4.ts |
| http://helper.com/DummyAd-seg5.ts | adserver.com/ad1-seg5.ts |
| http://helper.com/DummyAd-seg6.ts | placeholder_seg.ts |

TABLE 12

| | |
|---|---|
| http://helper.com/DummyAd-seg1.ts | placeholder_seg.ts |
| http://helper.com/DummyAd-seg2.ts | adserver.com/ad1-seg1.ts |
| http://helper.com/DummyAd-seg3.ts | adserver.com/ad1-seg2.ts |
| http://helper.com/DummyAd-seg4.ts | adserver.com/ad1-seg3.ts |
| http://helper.com/DummyAd-seg5.ts | adserver.com/ad1-seg4.ts |
| http://helper.com/DummyAd-seg6.ts | adserver.com/ad1-seg5.ts |

At some point after receiving the response from stitcher 106 and mapping dummy URLs to ad segment URLs, helper 104 will respond to request messages corresponding to the dummy URLs, and helper may respond according to the mappings. For example, assuming the mapping shown in Table 9, when helper 104 processes a request message m222 for DummyAd-seg1.ts (e.g., an HTTP Get message wherein the request target of the GET message contains or consists of the string "DummyAd-seg1.ts"), helper 104 responds to such request by providing to player 102 a response message m224 that contains ad1-seg1.ts or an HTTP redirect containing the corresponding ad segment URL. If response message m224 includes the redirect, this causes player 102 to transmit to media server 108 a request message m226 identifying the requested ad segment and then media server 108 responds by transmitting a response message m228 that contains the requested ad segment (or it could possibly contain another redirect).

Likewise, assuming the mapping shown in Table 9, when helper 104 receives request messages for DummyAd-seg2.ts and DummyAd-seg3.ts, helper will respond to each such request, respectively, by either providing to the player ad1-seg2.ts and ad1-seg3.ts, respectively, or providing to the player an HTTP redirect containing the corresponding ad segment URL. That is, when helper receives a request for DummyAd-segY.ts, helper either returns ad1-segY.ts or an HTTP redirect message containing the ad segment URL for ad1-segY.ts (i.e., adserver.com/ad1-segY.ts), where Y=1, 2, 3. In contrast, (still assuming the mapping shown in Table 9) when helper 104 receives a request for DummyAd-segX.ts (X=4, 5, or 6), then helper 104 provides to the player a short placeholder segment (placeholder_seg.ts) (e.g., a 500 ms or 1 second segment) (this can happen even if DummyAd-segX.ts is not mapped to a placeholder segment because, in such a case, helper may have logic that instructs it to respond to a request for a segment with a placeholder (or other selected segment) when the requested segment is not mapped to an ad segment or placeholder segment).

As noted above, in embodiments in which helper 104 receives from stitcher 106 ad segment URLs identifying ad segments selected by stitcher 106 (or the ad segments themselves) before helper 104 performs the ad break placeholder insertion process (see above description of message m210), helper 104 may insert into the manifest the ad segment URLs corresponding to the ad segments selected by stitcher 106. In such an embodiment, there is a possibility that, in performing the mapping process described above, helper 104 decides to cause the player to request ad segments identified in message m220 rather than the ad segments identified in message m210. For example, assume that message m210 identified the following three add segments (ad1-seg1.ts, ad1-seg2.ts, and ad1-seg3.ts) and assume that message m220 identified at the following five add segments (ad2-seg1.ts, ad2-seg2.ts, ad2-seg3.ts, ad2-seg4.ts, ad2-seg5.ts) and that helper 104 has decided to replace ad1 with ad2 (e.g., ad2 may be more valuable than ad1), then in this scenario the mapping process may produce the following mapping:

TABLE 13

| Ad segment URLs inserted into Manifest | Corresponding URLs |
|---|---|
| http://helper.com/ad1-seg1.ts | adserver.com/ad2-seg1.ts |
| http://helper.com/ad1-seg2.ts | adserver.com/ad2-seg2.ts |
| http://helper.com/ad1-seg3.ts | adserver.com/ad2-seg3.ts |
| http://helper.com/DummyAd-seg1.ts | adserver.com/ad2-seg4.ts |
| http://helper.com/DummyAd-seg2.ts | adserver.com/ad2-seg5.ts |
| http://helper.com/DummyAd-seg3.ts | placeholder_seg.ts |

As noted above, there are embodiments in which helper 104 inserts additional dummy URLs to the manifest (see Table 6). In these embodiments, when a URL for a dummy ad segment is not mapped to an ad segment URL or actual ad segment, but rather is mapped to the short placeholder segment (see, e.g., DummyAd-seg6.ts in Table 9), then helper will map the corresponding additional dummy URL (e.g., the URL for AdditionalDummyAd-seg6.ts) to a long placeholder segment (e.g., a 3 second or 6 second placeholder segment) such that when helper receives a request for this corresponding additional dummy segment helper returns the long placeholder segment rather than the short placeholder segment it would have otherwise returned. For specific examples with reference to Table 9, when helper 104 receives a request for AdditionalDummyAd-segY.ts (Y=1, 2, 3), helper return the short (e.g., 500 ms) placeholder segment because DummyAd-segY.ts is mapped to ad1-segY.ts, whereas when helper receives a request for AdditionalDummyAd-segX.ts (X=4,5), helper return a first long (e.g., a 6 second) placeholder segment because DummyAd-segX.ts is mapped to a placeholder segment and the #EXTINF value for these dummy segments is set to 6 seconds, and when helper receives a request for AdditionalDummyAd-seg6.ts, helper return a second long (e.g., a 3 second) placeholder segment because DummyAd-seg6.ts is mapped to a placeholder segment and the #EXTINF value for this dummy segments is set to 3 seconds. In this manner, the total duration of the media, as defined in the manifest to the player, is maintained.

In other words, when player 102 requests, for example, DummyAd-seg4.ts, which we will assume is mapped to a short placeholder segment, instead of returning a 6 second segment as specified in the playlist by the #EXTINF tag for that segment, the helper instead returns a short (e.g. 500 ms) placeholder segment. Accordingly, when player requests AdditionalDummyAd-seg4.ts, which corresponds to DummyAd-seg4.ts, instead of returning a 1 second segment as specified by the #EXTINF tag for that segment, helper 104 returns a 6 second black segment. In this manner, the duration of the media remains constant and helper 104 is simply rearranging (conceptually) where the "black video" is being played within the timeline. In an extreme example, helper 104 could do this for the entire ad break, reducing what would be a 60 second break to 6 seconds of black (or a chosen placeholder video).

In another embodiment, rather than mapping dummy URLs that were inserted into the manifest to a placeholder segment when there is no available ad segment, the dummy URLs are mapped to information (e.g., a pre-defined "not available" status code, such as an HTTP 404 status code or other status code, or other information) that indicates to the player that the requested segment is being skipped. That is, in this embodiment, when helper receives a request for, for example, DummyAd-seg1.ts and this dummy URL has not been mapped to any ad segment, helper responds to the request by sending to the player a response message with information (e.g., a pre-defined status code, such as an HTTP 404 or other information) that indicates to the player that the requested segment is being skipped. Such a response message may contain a status code with no response body where the status code indicates that no segment is being returned in response to the request (i.e., the segment is being skipped). As another example, the response message includes a status code (e.g., 200 OK) and a content-length parameter set to 0 to indicate that no segment is being returned in response to the request. As yet another example, the response message comprises a header and the information that indicates to the player that the requested segment is being skipped is contained in the header. As yet another example, the response message comprises a non-zero length body and the information that indicates to the player that the requested segment is being skipped is contained in the body of the message.

Figure 3:
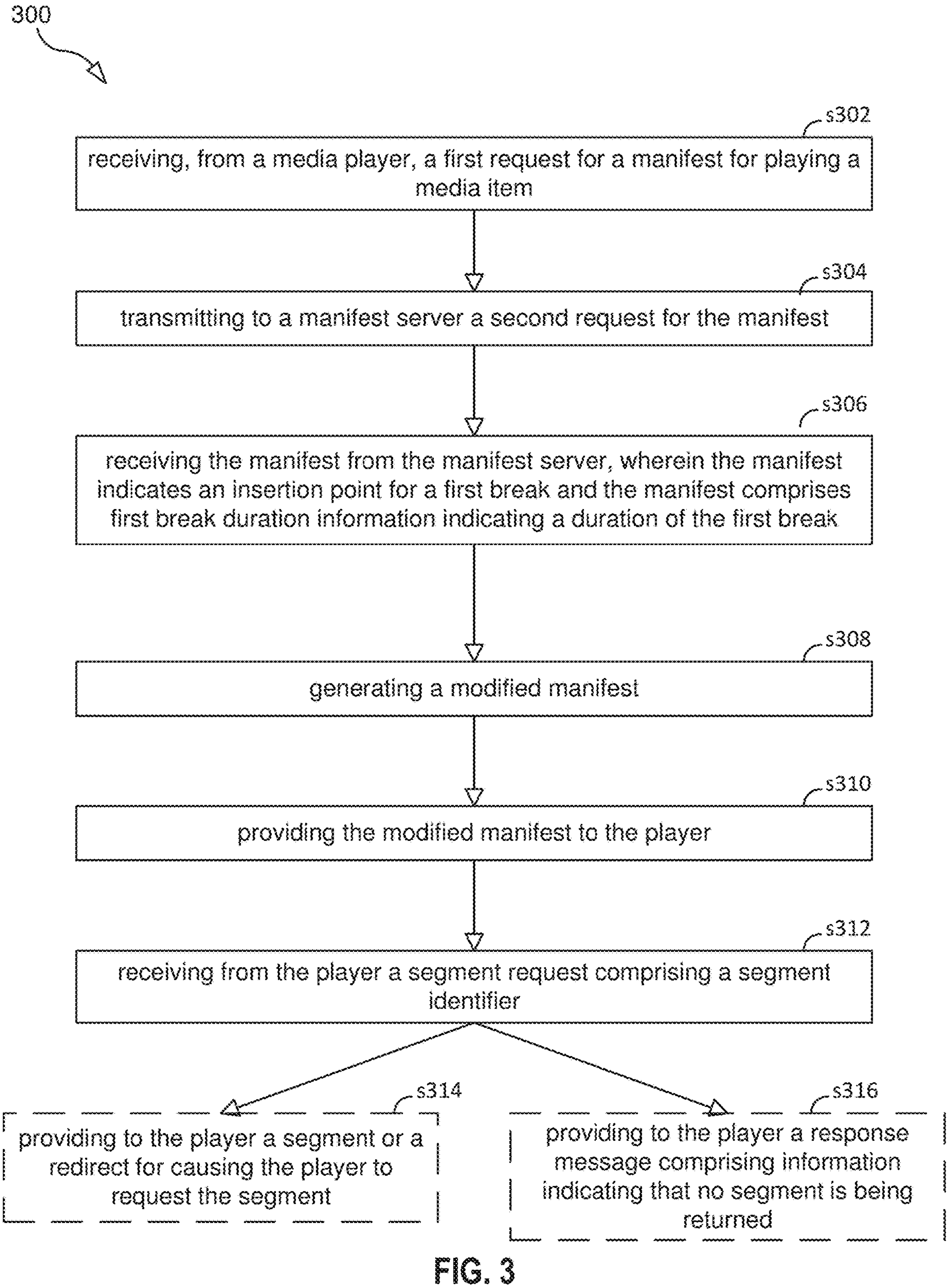
FIG. 3 is a flowchart illustrating a process according to an embodiment.

FIG. 3 is a flowchart illustrating a process 300 that includes: receiving (step s302), from a media player, a first request for a manifest for playing a media; transmitting (step s304) to a manifest server a second request for the manifest; receiving (step s306) the manifest from the manifest server, wherein the manifest indicates an insertion point for a first ad break and the manifest comprises first ad break duration information indicating a duration of the first ad break; generating (step s308) a modified manifest, wherein generating the modified manifest comprises inserting into the manifest at the insertion point first segment locator information for causing the player to request a number of segments, wherein the first segment locator information comprises a first uniform resource locator (URL) (absolute or relative) or URL template information for generating the first URL, and wherein the first URL includes a segment identifier (e.g., the first URL may consist of or comprise the segment identifier), and further wherein the modified manifest comprises segment duration information specifying a segment duration associated with the segment identifier; providing (step s310) the modified manifest to the player; receiving (step s312) from the player a segment request comprising the segment identifier; and in response to receiving the segment request comprising the segment identifier, i) providing (step s314) to the player a segment or a redirect message for causing the player to request the segment, wherein the segment is either a segment identified by the segment identifier or another segment (e.g., a segment to which the segment identifier is mapped), and the duration of the segment is less than the segment duration associated with the segment identifier or ii) providing (step s316) to the player a response message comprising information indicating that no segment is being returned.

In some embodiments, the first segment locator information comprises a list of N1 URLs comprising the first URL (but there is no requirement that the first URL be positioned first in the list; the first URL may be positioned anywhere in the list), where N1>1, or the first segment locator information comprises URL template information that can be used by the player to generate the list of N1 URLs.

In some embodiments, the duration of the first ad break is associated with a set of two or more potential ad sets, wherein each potential ad set requires a specific number of segments, and N1=max (s1, s2, . . . , sM), where si for i=1 to M is the specific number of segments required by the ith potential ad set.

In some embodiments, the first segment locator information further comprises, for each URL in the list of N1 URLs, metadata for the URL (e.g., #EXT-X-INF tag, byte range information).

In some embodiments, generating the modified manifest comprises inserting into the manifest first segment grouping information for forming two or more groups of the N1 number of URLs.

In some embodiments, the N1 URLs further comprises a second URL, and inserting into the manifest the first segment grouping information comprises inserting into the manifest a discontinuity tag (e.g., an HLS EXT-X-DISCONTINUITY tag) such that in the modified manifest the discontinuity tag comes after the first URL but comes before the second URL.

In some embodiments, the first segment grouping information comprises: a first period element comprising: i) a first subset of the N1 URLs or ii) URL template information for use in generating the first subset of URLs; and a second period element comprising: i) a second subset of the N1 URLs or ii) URL template information for use in generating the second subset of URLs.

In some embodiments, process 300 further comprises: after providing the modified manifest to the player, submitting to an stitcher an ad request for triggering the stitcher to select a set of ads to fill the first ad break; receiving from the stitcher a response responsive to the ad request the response comprising a set of M segment URLs or a set of M ad segments, where M≤N1, wherein the set of M segment URLs comprises a first ad segment URL or the set of M ad segments comprises a first ad segment; and mapping the first URL included in the list of N1 URLs with the first ad segment URL or the first ad segment.

In some embodiments, at the time the first segment locator information is inserted into the manifest, the first URL is a dummy URL (e.g. DummyAd-seg1.ts) that is associated with no segment or a placeholder segment (e.g., a segment which consists essentially of black frames).

In some embodiments, process 300 further comprises: prior to generating the modified manifest, using information indicating the duration of the first ad break to obtain first ad set information, wherein the first ad set information comprises the first segment locator information or the first segment locator information is derived using the first ad set information.

In some embodiments, the duration of the segment is less than D−1, wherein D is the specified segment duration in units of seconds.

In some embodiments, the duration of the segment is less than 1 second.

In some embodiments, the segment is a placeholder segment.

In some embodiments, the manifest indicates an insertion point for a second ad break and the manifest comprises second ad break duration information indicating a duration of the second ad break, and generating the modified manifest further comprises inserting into the manifest at the insertion point for the second ad break second segment locator information for causing the player to request a number of segments, wherein the second segment locator information comprises a list of N2 URLs, where N2>1, or the second segment locator information comprises second URL template information that can be used by the player to generate the list of N2 URLs.

Additional Ad Break Use Case

Figure 4:
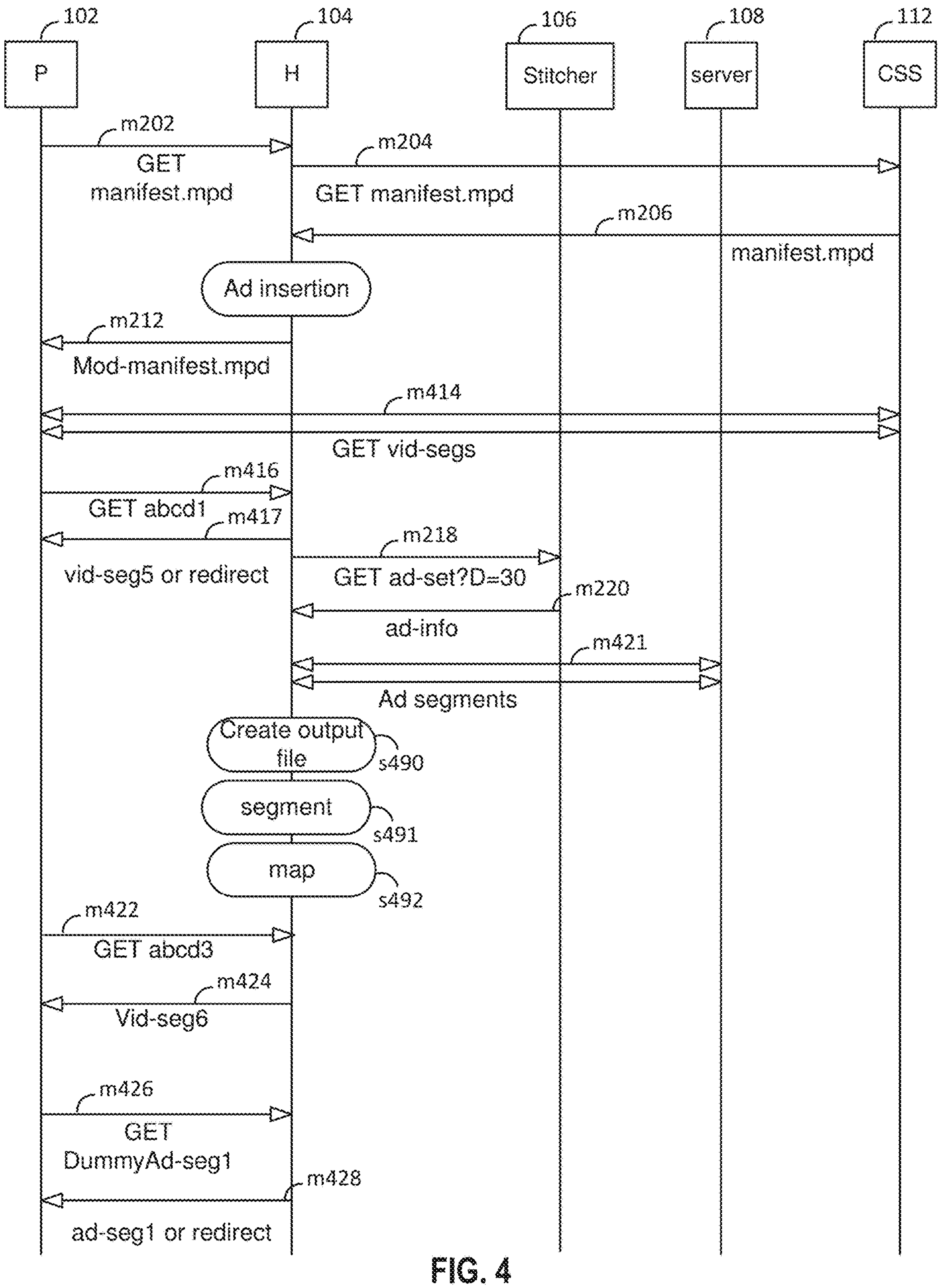
FIG. 4 is a message flow diagram according to an embodiment.

FIG. 4 is a message flow diagram illustrating a process according to another use case. The process may begin with player 102 sending request message m202 (e.g. HTTP GET message) identifying a manifest (e.g., manifest.mpd). Request message m202 is received at helper 104.

In response to receiving request message m202, helper 104 sends to CSS 112 request message m204 identifying the manifest. In response to receiving message m204, CSS 112 sends to helper 104 a response message m206 comprising the requested manifest. Helper 104 may obtain information about ad breaks to be inserted into the manifest. For instance, the information about the ad breaks may come from an EventStream element included in the received manifest or helper 104 may make a Video Multiple Ad Playlist (VMAP) request to get the information as is known in the art (this is also true for the HLS).

For each ad break to be inserted into the manifest, helper 104 performs an ad break placeholder insertion process that, in at least one embodiment, as explained above, comprises: i) determining the duration of the ad break; ii) determining ad set information based on (e.g., based solely on) the duration of the ad break; and iii) inserting into the manifest at the "location" of the ad break the determined ad set information (or information derived therefrom), which information includes segment locator information (e.g., a set of URLs or a template for generating URLs). After inserting the information including the segment locator information into the manifest, thereby producing a modified manifest, helper 104 provides to player 102 a response message m212, which contains the modified manifest (e.g., Mod-manifest.mpd).

Inserting Ad Set Information into the Manifest

As noted above, in one embodiment helper 104 inserts into the manifest at the location of the ad break the determined ad set information (or, for example, segment locator information derived therefrom). A specific example using an MPEG-DASH manifest is illustrated below in Table 14. For this example, the manifest shown in Table 2A is the manifest helper 104 received in response to its manifest request m204. For this example, we will also assume that the ad set information is the same ad set information corresponding to the 30 second ad break shown in Table 4. Given this ad set information, helper may produce a modified manifest as shown in Table 14.

TABLE 14

```
<MPD ...>
<Period id="1"...>
  <AdaptationSet mimeType="video/mp4" ...>
    <Representation id="rep1" bandwidth="10392000" ...>
      <SegmentList ...>
        <SegmentURL media="http://cdn.com/vid-rep1-seg1.mp4"/>
        <SegmentURL media="http://cdn.com/vid-rep1-seg2.mp4"/>
        <SegmentURL media="http://cdn.com/vid-rep1-seg3.mp4"/>
        <SegmentURL media="http://cdn.com/vid-rep1-seg4.mp4"/>
        <SegmentURL media="http://helper.com/abcd1"/>
        <SegmentURL media="http://helper.com/abcd2"/>
        <SegmentURL media="http://helper.com/abcd3"/>
        <Initialization sourceURL="http://cdn.com/init1.mp4"/>
      </SegmentList>
    </Representation>
  </AdaptationSet>
</Period>
<Period id="ad_break_1" ...> /** This period corresponds to an ad
break **/
 <AdaptationSet mimeType="video/mp4" ...>
    <Representation id="rep1" bandwidth="10392000" ...>
      <SegmentList ...>
        <SegmentURL media="http://helper.com/DummyAd-rep1-seg1"/>
        <SegmentURL media="http://helper.com/DummyAd-rep1-seg2"/>
        <SegmentURL media="http://helper.com/DummyAd-rep1-seg3"/>
        <SegmentURL media="http://helper.com/DummyAd-rep1-seg4"/>
        <SegmentURL media="http://helper.com/DummyAd-rep1-seg5"/>
        <SegmentURL media="http://helper.com/DummyAd-rep1-seg6"/>
        <Initialization sourceURL="http://helper.com/init.mp4"/>
      </SegmentList>
    </Representation>
  </AdaptationSet>
</Period>
```

TABLE 14-continued

```
<Period id="2"...>
 <AdaptationSet mimeType="video/mp4" ...>
     <Representationid="rep1" bandwidth="10392000" ...>
       <SegmentList ...>
         <SegmentURL media="http://cdn.com/vid-rep1-seg8.mp4"/>
         <SegmentURL media="http://cdn.com/vid-rep1-seg9.mp4"/>
         <SegmentURL media="http://cdn.com/vid-rep1-seg10.mp4"/>
         <SegmentURL media="http://cdn.com/vid-rep1-seg11.mp4"/>
         <Initialization sourceURL="http://cdn.com/init1.mp4"/>
       </SegmentList>
     </Representation>
   </AdaptationSet>
</Period>
</mpd>
```

In the example shown, the dummy URLs are of the form: http://FQDN/stringN, where "FQDN" is the helper's fully qualified domain name (e.g., helper.com), "string" is a constant (e.g., "DummyAd-rep1-seg") and "N" is a variable where N=1, 2, . . . , or 6, so that each dummy URL is unique. However, in another embodiment, each dummy URL may be of the form: http://FQDN/string so that each dummy URL is the same as each other dummy URL.

Additionally, as shown in the table above, in some embodiments, helper 104 may modify one or more of the segment URLs included in the original manifest to cause the player to transmit to the helper one or more of the presentation segments requests (i.e., requests of obtaining segments of the presentation). For instance, in the example shown, the helper replaced the 5th, 6th, and 7th segment URL in the first period element with the following replacement URLs "http://helper.com/abcd1," "http://helper.com/abcd2," and "http://helper.com/abcd3," respectively. As should be noted, each replacement URL within the same segment list element includes a unique string (e.g., "abcd1") within the segment list and each points to helper 104 (e.g., each replacement URL includes the helper's fully qualified domain name (FQDN)). In this way, the 5th, 6th, and 7th presentation segment requests in addition to the ad segment requests will be sent by player 102 to helper 104. More generically, helper may modify the manifest so that at least some (i.e., all or less than all) presentation segments requests are sent to the helper.

If any presentation segment requests are sent to the helper, some of the replacement URLs may include a "trigger" indicator. For instance (using an MPD as an example), the helper may replace the following URLs in the original manifest:

<SegmentURL media="http://cdn.com/vid-rep1-seg1.mp4"/>
<SegmentURL media="http://cdn.com/vid-rep1-seg2.mp4"/>
<SegmentURL media="http://cdn.com/vid-rep1-seg3.mp4"/>
<SegmentURL media="http://cdn.com/vid-rep1-seg4.mp4"/>
<SegmentURL media="http://cdn.com/vid-rep1-seg5.mp4"/>
<SegmentURL media="http://cdn.com/vid-rep1-seg6.mp4"/>
<SegmentURL media="http://cdn.com/vid-rep1-seg7.mp4"/> with the following replacement URLs:

<SegmentURL media="http://helper.com/abcd1"/>
<SegmentURL media="http://helper.com/abcd2"/>
<SegmentURL media="http://helper.com/abcd3"/>
<SegmentURL media="http://helper.com/abcd4"/>
<SegmentURL media="http://helper.com/abcd5?trigger=1"/>
<SegmentURL media="http://helper.com/abcd6?trigger=1"/>
<SegmentURL media="http://helper.com/abcd7?trigger=1"/>

If the helper replaces a URL (e.g., http://cdn.com/vid-rep1-seg4.mp4) in the original manifest with a replacement URL that points to the helper (e.g., http://helper.com/abcd1), then the helper will associate the replacement URL with the segment identified by the replaced segment URL. For example, the helper may create a data structure to map each replacement URL with the URL that the replacement URL replaced (or other information that identifies the segment that was identified by the URL that was replaced by the replacement URL). Accordingly, the information to which the replacement URL is mapped may comprise all or a portion of the replaced URL.

Another example of a manifest that may be received in message m206 is illustrated below in Table 15.

TABLE 15

```
<MPD mediaPresentationDuration="3740.08" ...>
 <Period id="1" duration="3740.08" ...>
  <EventStream>
   <Event
   presentationTime="400"
   duration="0"
   id="10">
   </Event>
  </EventStream>
  <BaseURL>http://cdn.com/dash/</BaseURL>
   <SegmentTemplate timescale="1"
   initialization="init-$RepresentationID$.mp4"
   media="media-$RepresentationID$-$Time$.mp4">
    <SegmentTimeline>
     <S t="0" d="4" r="934" />
     <S d="0.08" />
    </SegmentTimeline>
   </SegmentTemplate>
   <Representation id="rep1"> </Representation>
 </Period>
</MPD>
```

The manifest shown in Table 15 is a single period manifest for a presentation that has a presentation time of 3740.08 seconds. The manifest includes information that indicates that an ad break should be inserted after 400 seconds of presentation time (in this example, the information is in the form of an Event element within an EventStream element. The manifest also includes a SegmentTemplate element for generating a list of segment URLs, as opposed to including the segment URLs in the manifest itself as illustrated in Table 14 (this feature can be advantageous because it makes the manifest smaller).

Given the manifest shown in Table 15, helper may produce a modified manifest as shown in Table 16.

TABLE 16

```
<MPD mediaPresentationDuration=”3770.08” ...>
 <Period id="1" duration="400">
  <BaseURL>http://cdn.com/dash/</BaseURL>
    <SegmentTemplate timescale="1"
     initialization="init-$RepresentationID$.mp4"
     media="media-$RepresentationID$-$Time$.mp4">
     <SegmentTimeline>
      <S t="0" d="4" r="99" />
    </SegmentTimeline>
   </SegmentTemplate>
   <Representation id=“rep1” ...> </Representation>
 </Period>
<Period id="2" duration="30">
  <BaseURL>http://helper.com/</BaseURL>
    <SegmentTemplate timescale="1"
     startnumber=1
     initialization="init.mp4"
     media="DummyAd-$RepresentationID$-seg$Number$.mp4">
     <SegmentTimeline>
      <S t="0" d="6" r="4" />
    </SegmentTimeline>
   </SegmentTemplate>
   <Representation id=“rep1” ...> </Representation>
 </Period>
 <Period id="3" duration="3340.08">
  <BaseURL>http://cdn.com/dash/</BaseURL>
   <SegmentTemplate timescale="1"
    initialization="init-$RepresentationID$.mp4"
    media="media-$RepresentationID$-$Time$.mp4">
    <SegmentTimeline>
      <S t="400" d="4" r="834" />
      <S d="0.08" />
    </SegmentTimeline>
   </SegmentTemplate>
   <Representation id=“rep1” presentationTimeOffset="400" ...> </Representation>
 </Period>
</MPD>
```

As shown in Table 16, helper converted the single-period manifest into a multi-period manifest. More specifically, the helper “split” the single Period of the original manifest into two periods and inserted a period between the two. That is, the modified manifest includes a first Period element for the first 400 seconds of the presentation, a second Period immediately following the first period for the ad break (in this example, a 30 second ad break was chosen), and a third period immediately following the second period for the remaining 3340.08 seconds of the presentation. Because a 30 second ad break was inserted the mediaPresentationDuration increased from 3740.08 to 3770.08 seconds as illustrated in the table above. As noted in Table 16, the third Period element includes presentationTimeOffset attribute set to a value of 400 seconds to indicate to the player the timecodes in the returned segments need to be shifted back by 400 seconds to match the period’s zero presentation timestamp. More generically, for example, if the original manifest indicated that N ad breaks should be inserted, then the helper may split the single period into N+1 periods and insert an ad break period between each period. As another example, helper may split the single period into N periods and insert an ad break period either after or before each one of the N periods.

As another example, given the manifest shown in Table 15, helper may produce a modified manifest as shown in Table 17.

TABLE 17

```
<MPD mediaPresentationDuration=”3770.08”...>
 <Period id="1" duration="368">
  <BaseURL>http://cdn.com/dash/</BaseURL>
    <SegmentTemplate timescale="1"
     initialization="init-$RepresentationID$.mp4"
     media="media-$RepresentationID$-$Time$.mp4">
     <SegmentTimeline>
      <S t="0" d="4" r="91" />
    </SegmentTimeline>
   </SegmentTemplate>
   <Representation id=“rep1” ...> </Representation>
 </Period>
 <Period id="2" duration="32">
  <BaseURL>http://helper.com/</BaseURL>
    <SegmentTemplate timescale="1"
     startNumber=1
     initialization="init-$RepresentationID$.mp4"
     media="abcd$Number$">
```

TABLE 17-continued

```
      <SegmentTimeline>
        <S t="368" d="4" r="7" />
      </SegmentTimeline>
    </SegmentTemplate>
    <Representation id="rep1" presentationTimeOffset="368" ...> </Representation>
 </Period>
<Period id="3" duration="30">
  <BaseURL>http://helper.com/dash/</BaseURL>
    <SegmentTemplate timescale="1"
      startnumber=1
      initialization="init.mp4"
      media="DummyAd-$RepresentationID$-seg$Number$.mp4">
      <SegmentTimeline>
        <S t="0" d="6" r="4" />
      </SegmentTimeline>
    </SegmentTemplate>
    <Representation id="rep1" ...> </Representation>
 </Period>
 <Period id="4" duration="3340.08">
  <BaseURL>http://cdn.com/dash/</BaseURL>
    <SegmentTemplate timescale="1"
      initialization="init-$RepresentationID$.mp4"
      media="media-$RepresentationID$-$Time$.mp4">
      <SegmentTimeline>
        <S t="400" d="4" r="834" />
        <S d="0.08" />
      </SegmentTimeline>
    </SegmentTemplate>
    <Representation id="rep1" presentationTimeOffset="400" ...> </Representation>
 </Period>
</MPD>
```

The modified manifest shown in Table 17 is nearly identical to the one shown in Table 16 with the most significant difference being that the manifest shown in Table 17 is configured to cause the player transmit to the helper eight (8) requests for presentation segments prior to transmitting a request for an inserted segment (i.e., an ad segment in this example). More specifically, the first Period element shown in Table 16, which has a duration of 400 seconds, is split into two Period elements: a first Period element with a duration 368 seconds and a second Period element with a duration of 32 seconds. The 92 URLs that are generated based on the segment template included in the first period shown in Table 17 are identical to the first 92 URLs that are generated based on the segment template included in the first period shown in Table 16. But the 8 URLs that are generated based on the segment template included in the second period shown in Table 17 are different than the remaining 8 URLs that are generated based on the segment template included in the first period shown in Table 16. More specifically, each these 8 URLs generated based on the segment template included in the second period shown in Table 17 cause the player to transmit to the helper a request (e.g., an HTTP Get message wherein the request target of the GET message contains or consists of the string "abcdN", where N=1, 2, . . . , or 8)

Referring back to FIG. 4, after player 102 receives the modified manifest (e.g., the manifest shown in Table 14), player 102 begins sending segment requests according to the manifest (e.g., requests for segments of the presentation, which is a video in this example). For example, as shown in FIG. 4, player 102 may initially send to CSS 112 one or more segment requests m414 (and CSS 112 responds by sending the requested segments to player 102) followed by player 102 sending to helper 104 one or more segment requests (e.g., request m416). For instance, using the manifest shown in Table 14 as an example, player 102 will i) send to CSS 112 (i.e., "cdn.com" in this example) four segment requests (i.e., a request for vid-rep1-seg1.mp4, a request for vid-rep1-seg2.mp4, a request for vid-rep1-seg3.mp4, and a request for vid-rep1-seg4.mp4) and ii) after sending the segment requests to CSS 112, send a request m416 to helper 104 (i.e., a request containing the string "abcd1"). Likewise, using the manifest shown in Table 17 as an example, player 102 will send multiple segment requests to CSS 112 before sending to helper request m416.

In one embodiment, in response to request m416, the helper will: 1) send to the player a response m417 responsive to the request and 2) initiate the transmission of a request to stitcher 106 (e.g., determine whether a request to stitcher 106 is needed, and, if so, send to stitcher request message m218 indicating that helper is requesting one or more ads (i.e. a set of ads) to fill an ad break). For instance, in one embodiment, the helper determines whether a request to stitcher 106 is needed by checking whether a flag is set to TRUE (e.g., equal to 1) and if the flag is set to TRUE, then it is determined that a request to stitcher 106 is needed. In another embodiment, the helper determines whether a request to stitcher 106 is needed by checking both whether the flag is set to TRUE and whether the request includes a trigger string (e.g., "trigger=1"), and if the flag is set to TRUE and request includes the trigger string, then it is determined that a request to stitcher 106 is needed. After sending the request, the flag is set to FALSE. The flag may be set back to TRUE after the ad break has finished. Response message m417 either contains the requested segment or a redirect message that causes player 102 to send a request message to a server (e.g. a server within CSS) for the segment.

In this example, stitcher 106 responds to request m218 by selecting one or more ads (or other pieces of media content) and transmitting to helper 104 a response message m220 that contains a manifest containing segment locator information (e.g., segment URLs and/or template information enabling helper to produce segment URLs) for retrieving the segments of the one or more ads selected by stitcher 106. For instance, the manifest returned by stitcher 106 may include a first period element containing segment URLs (or corresponding template information) for the first ad and a second period element containing segment URLs (or corresponding template information) for the second ad.

After receiving response message m220, helper 104 uses the segment locator information in the response message to retrieve all of the identified segments (e.g., by sending segment requests m421). Next, the helper creates an output file (step s490) comprising encoded media data from the retrieved segments. Next, the helper segments the output file to produce a set of media content segments (step s491), wherein each media content segment contains a portion of the encoded media data contained in the output file (an initialization segment may also be produced in addition to the media content segments).

In one embodiment, step s490 (creating the output file) comprises the helper: i) creating a first temporary file containing a first set of segments (e.g., all of the segments of ad1), ii) creating a second temporary file containing a second set of segments (e.g., all of the segments for ad2), and iii) concatenating the first and second temporary files, thereby producing the output file. In one embodiment, each media content segment in the second temporary file contains one or more timestamps, and the step of concatenating the first and second temporary files comprises modifying the timestamp(s).

Assuming the segments for the first ad consist of the following segments: s11, s12, . . . , s1N and the segments for the second ad consist of the following segments: s21, s22, . . . , s2M (s11 and s21 may be initialization segments), then, in one embodiment, the first temporary file is created running the cat commands shown in Table 18 and the second temporary file is created by running the cat commands shown in Table 19.

TABLE 18

| |
|---|
| cat s11.mp4 > tempFile1.mp4 |
| cat s12.mp4 >> tempFile1.mp4 |
| cat s13.mp4 >> tempFile1.mp4 |
| ... |
| cat s1N.mp4 >> tempFile1.mp4 |

TABLE 19

| |
|---|
| cat s21.mp4 > tempFile2.mp4 |
| cat s22.mp4 >> tempFile2.mp4 |
| cat s23.mp4 >> tempFile2.mp4 |
| ... |
| cat s2M.mp4 >> tempFile2.mp4 |

In one embodiment, helper 104 uses the FFmpeg tool to create the output file using the temporary files as input. For example, to concatenate tempFile1.mp4 with tempFile2.mp4 to produce the output file (e.g., out.mp4), helper may run the following command: ffmpeg-f concat-safe 0-i list.txt-c copy out.mp4, where list.txt is a two line text file wherein the first line is "tempFile1.mp4" and the second line is "tempFile2.mp4." Executing this ffmpeg command demuxes the files identified in list.txt one after the other, as if all their packets had been muxed together. The timestamps in the files are adjusted so that the first file starts at 0 and each next file starts where the previous one finishes. The duration of each file is used to adjust the timestamps of the next file (i.e., the duration of tempFile1 is used to adjust the timestamps of tempFile2).

After creating the output file, the helper may run the following ffmpeg command to create the segments (i.e., step s491):

ffmpeg-i out.mp4-codec copy-use_timeline 0-use_template 0-seg_duration 6-f dash out.mpd This command generates a single-period MPD that contains a period element matching the period element corresponding to the ad break (see e.g., the period element with id="ad_break_1" in Table 14) as well as the individual segments to be returned for the ads.

Each one of the media content segments generated by helper 104 in step s491 is mapped to one of the dummy URLs (step s492). Tables 20 and 21 illustrate possible mappings of dummy URLs to the media content segments (e.g., Table 20 illustrate possible mappings when the number of media content segments is three and Table 21 illustrate possible mappings when the number of media content segments is five).

TABLE 20

| | |
|---|---|
| helper.com/DummyAd-seg1.mp4 | seg1.mp4 |
| helper.com/DummyAd-seg2.mp4 | seg2.mp4 |
| helper.com/DummyAd-seg3.mp4 | seg3.mp4 |
| helper.com/DummyAd-seg4.mp4 | placeholder_seg.mp4 (or a "not available" status code) |
| helper.com/DummyAd-seg5.mp4 | placeholder_seg.mp4 (or a "not available" status code) |
| helper.com/DummyAd-seg6.mp4 | placeholder_seg.mp4 (or a "not available" status code) |

TABLE 21

| | |
|---|---|
| helper.com/DummyAd-seg1.mp4 | seg1.mp4 |
| helper.com/DummyAd-seg2.mp4 | seg2.mp4 |
| helper.com/DummyAd-seg3.mp4 | seg3.mp4 |
| helper.com/DummyAd-seg4.mp4 | seg4.mp4 |
| helper.com/DummyAd-seg5.mp4 | seg5.mp4 |
| helper.com/DummyAd-seg6.mp4 | placeholder_seg.mp4 (or a "not available" status code) |

Referring back to FIG. 4, player 102 continues sending segment requests according to the manifest. For example, as shown in FIG. 4, player 102 sends to helper 104 one or more segment requests, such as, for example, request m422, which is a request containing the string "abcd3". In one embodiment, in response to request m422, the helper sends to the player a response responsive to the request, such as response message m424, which either contains a segment (e.g., vid-rep1-seg3.mp4 or vid-rep1-seg7.mp4) or a redirect message that causes player 102 to send a request message to a server (e.g. a server within CSS) for the segment.

At some point in the process, player 102 sends requests corresponding to the dummy URLs, and helper may respond according to the mappings.

For example, assuming the mapping shown in Table 20, when helper 104 processes a request message m426 for DummyAd-seg1.mp4 (e.g., an HTTP Get message wherein the request target of the GET message contains or consists of the string "DummyAd-seg1.mp4"), helper 104 responds to such request by providing to player 102 a response message m428 that contains seg1.mp4 or an HTTP redirect containing a URL pointing to seg1.mp4.

Likewise, assuming the mapping shown in Table 20, when helper 104 receives request messages for DummyAd-seg2.mp4 and DummyAd-seg3.mp4, helper will respond to each such request, respectively, by either providing to the player seg2.mp4 and seg3.mp4, respectively, or providing to the player an HTTP redirect containing the corresponding URL. That is, when helper receives a request for DummyAd-segY.mp4, helper either returns segY.mp4 (or an HTTP redirect), where Y=1, 2, 3. In contrast, (still assuming the mapping shown in Table 20) when helper 104 receives a request for DummyAd-segX.mp4 (X=4, 5, or 6), then helper 104 provides to the player a short placeholder segment (e.g., a 500 ms or 1 second segment) or a "not available" (e.g., a "Not Found") response status code or some other default response.

While the embodiments have been explained for media segments, the embodiments apply equally to audio segments. As is known in the art, each period element of an MPD may include a video adaptation set (e.g., adaptation set with mimeType="video/mp4") and an audio adaptation set (e.g., adaptation set with mimeType="audio/mp4"). Hence, the embodiments may function with content that includes only video, only audio, or both audio and video.

In an embodiment, the manifest for the ad break may include: i) a first period element comprising first media segment locator information for retrieving media content segments for the period and first audio segment locator information for retrieving corresponding audio content segments for the period and ii) a second period element comprising second media segment locator information for retrieving media content segments for the period and second audio segment locator information for retrieving corresponding audio content segments for the period.

Accordingly, in such an embodiment, the helper performs a process that includes: 1) using the received first and second audio segment locator information to retrieve a first set of audio content segments and a second set of audio content segments, respectively; 2) creating an audio output file containing encoded audio data from the first set of audio content segments and encoded audio data from the second set of audio content segments; 3) segmenting the audio output file to produce a third set of audio content segments, wherein each audio content segment in the third set of segments contains a portion of the encoded audio data contained in the output file; and 4) for each audio content segment included in the third set of audio content segments, associating one of the dummy URLs in the audio adaptation set element with the audio content segment. Thus, when the helper receives a request corresponding to one of the dummy URLs in the audio adaptation set element, the helper may respond by transmitting to the player the audio content segment associated with the dummy URL.

Figure 5:
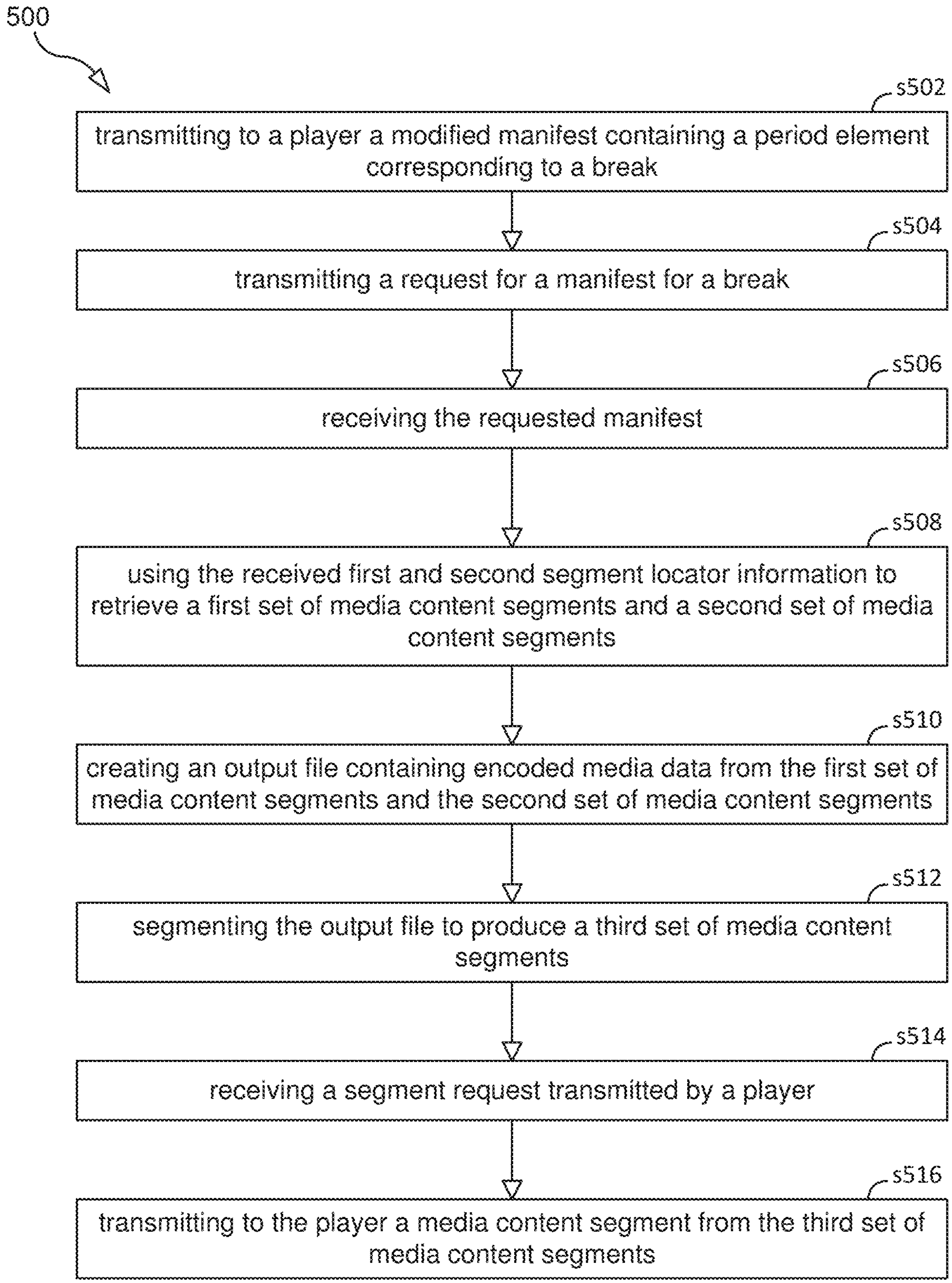
FIG. 5 is a flowchart illustrating a process according to an embodiment.

FIG. 5 is a flowchart illustrating a process 500 that includes: transmitting a modified manifest to a player (step s502), the modified manifest containing a period element corresponding to a content break (e.g., an ad break); after transmitting the modified manifest, transmitting a request for a manifest for the content break (step s504); receiving the manifest for the content break (step s506), wherein the manifest for the content break comprises i) a first period element containing first segment locator information for use in retrieving a first set of media content segments and ii) a second period element containing second segment locator information for use in retrieving a second set of media content segments; using the received first and second segment locator information to retrieve the first set of media content segments and the second set of media content segments, respectively (step s508); creating an output file containing encoded media data from the first set of media content segments and encoded media data from the second set of media content segments (step s510); segmenting the output file to produce a third set of media content segments (step s512), wherein each media content segment in the third set of segments contains a portion of the encoded media data contained in the output file; receiving a segment request transmitted by a player (step s514); and after receiving the segment request, transmitting to the player a media content segment from the third set of media content segments (step s516).

In some embodiments, creating the output file comprises: creating a first temporary file containing the first set of segments; creating a second temporary file containing the second set of segments; and concatenating the first and second temporary files, thereby producing the output file.

In some embodiments, each segment in the second temporary file contains one or more timestamps, and concatenating the first and second temporary files comprises modifying the timestamp(s) of each segment in the second temporary file.

In some embodiments, process 500 further includes: receiving, from the player, a first request for a manifest (e.g., Dash MPD, HLS playlist) for retrieving first media content (e.g., segments of a movie, an episode, etc.); after receiving the first request for the manifest, transmitting a second request for the manifest; after transmitting the second request for the manifest, receiving the requested manifest, wherein the requested manifest includes at least a first ordered list of N segment locators, and each segment locator in the first ordered list includes a first server identifier that identifies a first server; generating the modified manifest based on the received manifest, wherein the modified manifest includes at least a second ordered list of N segment locators, each one of the first M segment locators included in the second ordered list includes the first server identifier, where M>1 and M<N, each one of the N−M segment locators in the second ordered list that follow the first M segment locators in the second ordered list includes: i) a second server identifier that identifies a second server different than the first server and ii) a unique string.

In some embodiments, process 500 further includes: receiving, from the player, a request comprising one of the unique strings; and in response to receiving the request comprising one of the unique strings, i) transmitting to the player a response message responsive to the request comprising one of the unique strings and ii) transmitting a request for second media content to be served to the player during a break in the first media content (e.g., an ad break or some other break).

In some embodiments, the request for the second media content is a request for a manifest for the second media content, wherein the manifest comprises segment locator information for retrieving segments of the second media content.

In some embodiments, initiating the transmission of the request for the second media content comprises determining whether a request for the second media content is needed.

In some embodiments, the first set of media content segments consists of a first set of video content segments, wherein each video content segment in the first set of video content segments does not contain any encoded audio data, and the second set of media content segments consists of a second set of video content segments, wherein each video content segment in the second set of video content segments does not contain any encoded audio data.

In some embodiments, the first period element further contains first audio segment locator information for use in retrieving a first set of audio content segments, the second period element further contains second audio segment locator information for use in retrieving a second set of audio content segments, and the method further comprises: using the first and second audio segment locator information to retrieve the first set of audio content segments and the second set of audio content segments, respectively; creating an audio output file containing encoded audio data from the first set of audio content segments and encoded audio data from the second set of audio content segments; segmenting the audio output file to produce a third set of audio content segments, wherein each audio content segment in the third set of audio content segments contains a portion of the encoded audio data contained in the audio output file; receiving an audio segment request transmitted by the player; and after receiving the audio segment request, transmitting to the player an audio content segment from the third set of audio content segments.

In some embodiments, the first set of media content segments consists of a first set of audio content segments, wherein each audio content segment in the first set of audio content segments does not contain any encoded video data, and the second set of media content segments consists of a second set of audio content segments, wherein each audio content segment in the second set of audio content segments does not contain any encoded video data.

Figure 6:
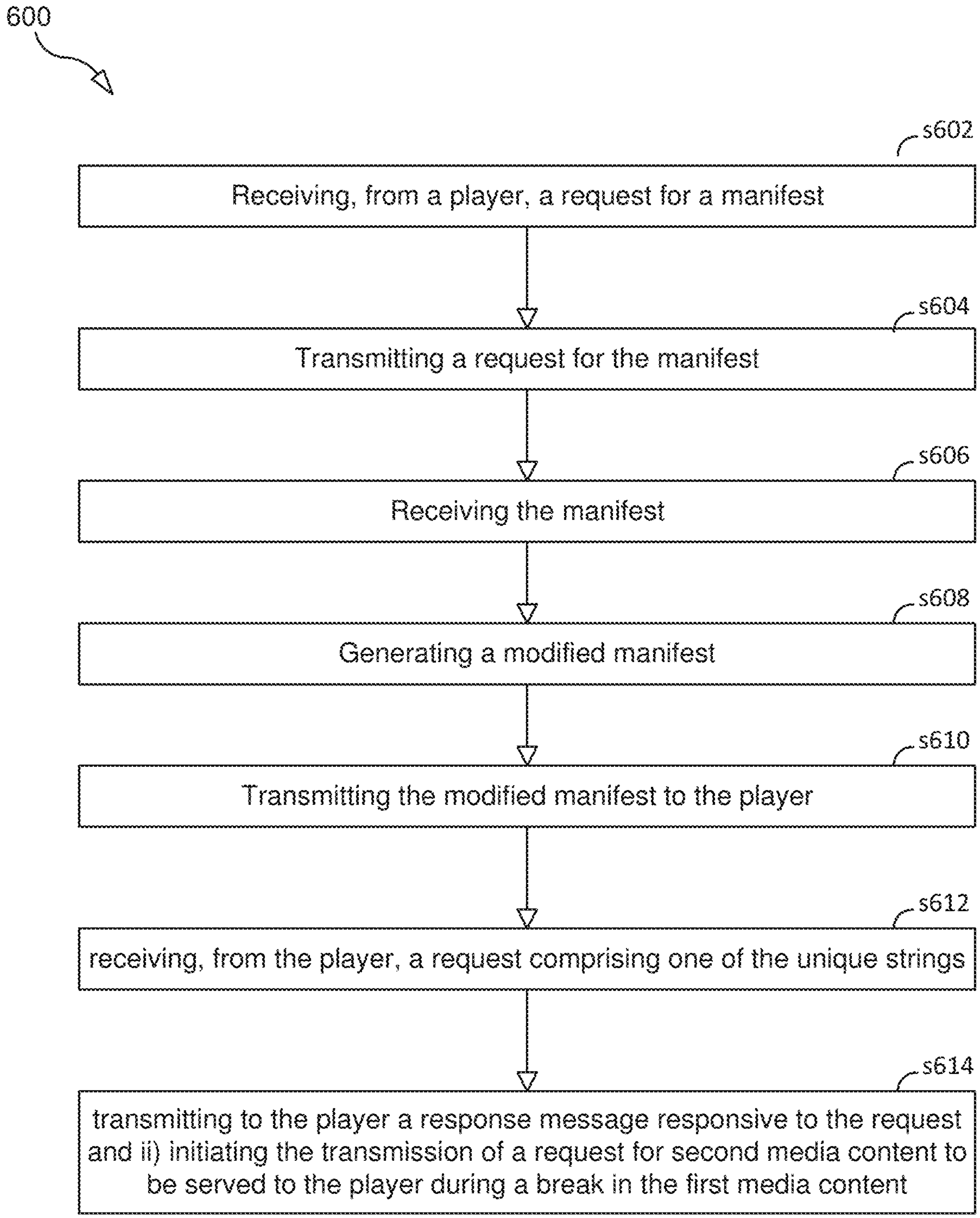
FIG. 6 is a flowchart illustrating a process according to an embodiment.

FIG. 6 is a flowchart illustrating a process 600 that includes: receiving, from a player, a first request for a manifest (e.g., Dash MPD, HLS playlist) for retrieving first media content (e.g., a movie, an episode, etc.) (step s602); after receiving the first request for the manifest, transmitting a second request for the manifest (step s604); after transmitting the second request for the manifest, receiving the requested manifest, wherein the requested manifest includes at least a first ordered list of N segment locators, and each segment locator in the first ordered list includes a first server identifier that identifies a first server (step s606); generating a modified manifest based on the received manifest (step s608), wherein the modified manifest includes at least a second ordered list of N segment locators, each one of the first M segment locators included in the second ordered list includes the first sever identifier, where M≥0 and M<N, each one of the N−M segment locators in the second ordered list that follow the first M segment locators in the second ordered list includes: i) a second server identifier that identifies a second server different than the first server and ii) a unique string; transmitting the modified manifest to the player (step s610); receiving, from the player, a request comprising one of the unique strings (step s612); and in response to receiving the request comprising one of the unique strings, i) transmitting to the player a response message responsive to the request and ii) initiating the transmission of a request for second media content to be served to the player during a break in the first media content (step s614).

In some embodiments, the request for the second media content is a request for a manifest for the second media content, wherein the manifest comprises segment locator information for retrieving segments of the second media content.

In some embodiments, initiating the transmission of the request for the second media content comprises determining whether a request for the second media content is needed.

Prefetching Use Cases

Figure 7:
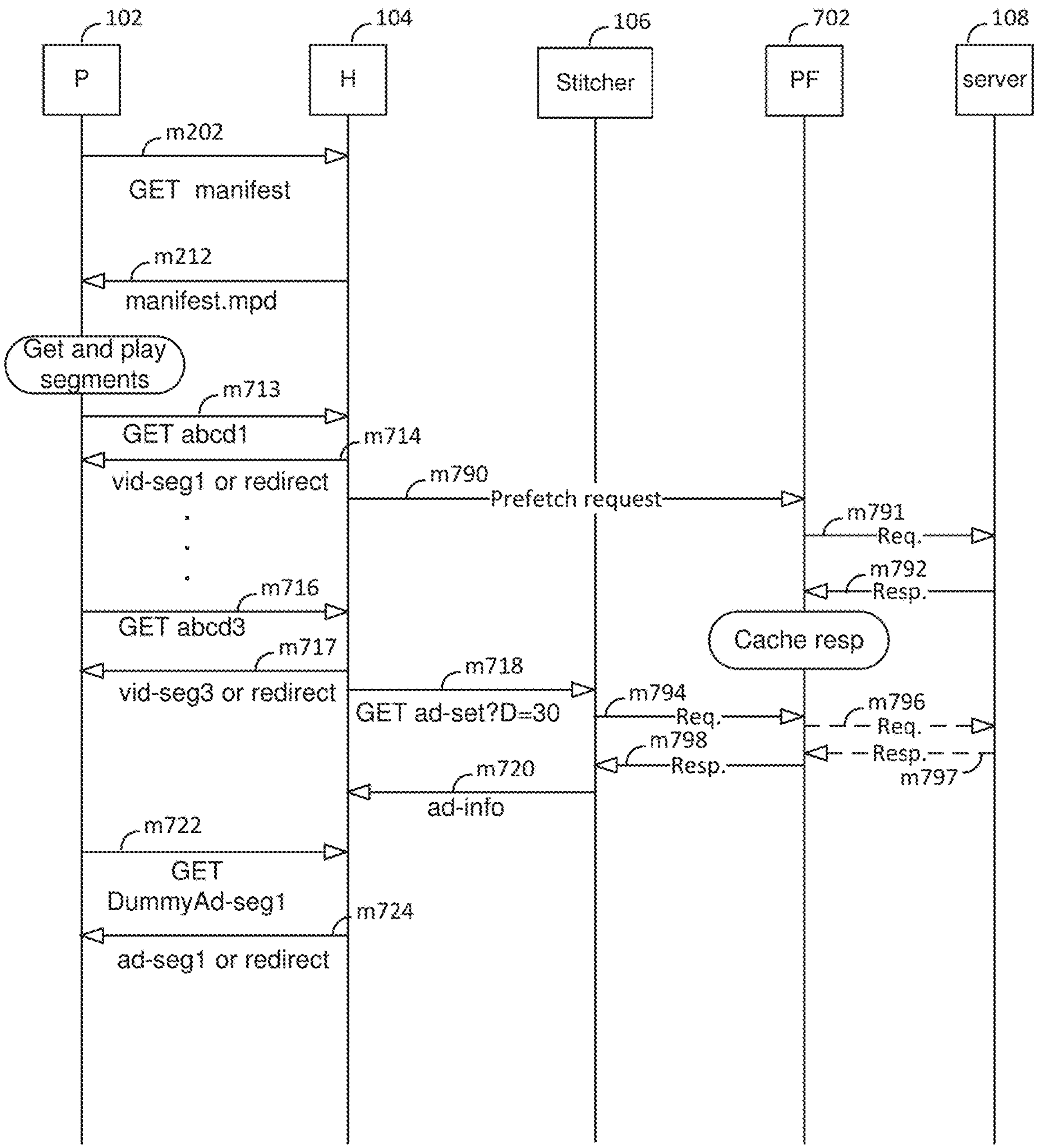
FIG. 7 is a message flow diagram according to an embodiment.

FIG. 7 is a message flow diagram illustrating a process according to a prefetching use case. The process may begin with player 102 sending request message m202, which may be a standard HTTP request and which may contain request data. In some embodiments, the request data is provided via HTTP standard mechanisms, such as HTTP headers, query parameters, or HTTP POST body data. In one embodiment, request message m202 identifies a manifest (e.g., manifest.mpd). In addition to including request data identifying the manifest, request message 202 may include other information such as, for example, "ad_params=<ad parameter values>" which specifies ad targeting parameters, "Pod_max_dur-60", which specifies 60 second ad pods, and "Cuepoints=60,120", which identifies two cue points, one 60 seconds after the start of the video and another 120 seconds after the start of the video. An example of attribute-value-pairs (AVPs) that may be included in message m202 is shown in table 22 below. Request message m202 is received at helper 104. As described above, after receiving request message m202, helper 104 provides to player 102 message m212, which contains a manifest.

TABLE 22

| |
|---|
| manifest=server.com/episode1.mpd& |
| lookahead=10000& |
| assetId=tos& |
| pod__max__dur=60& |
| cuepoints=60,120& |
| cue__preference=query& |
| ad__params=<data>& |
| otherAdParams=<data> |

After player 102 receives the manifest from helper 104 (e.g., the manifest shown in Table 14), player 102, as described above, begins sending segment requests according to the manifest. For example, as shown in FIG. 4, player 102 may initially send to CSS 112 one or more segment requests m414 (and CSS 112 responds by sending the requested segments to player 102) followed by player 102 sending to helper 104 one or more segment requests (e.g., request m416). For instance, using the manifest shown in Table 14 as an example, player 102 i) sends to CSS 112 (i.e., "cdn.com" in this example) four segment requests (i.e., a request for vid-rep1-seg1.mp4, a request for vid-rep1-seg2.mp4, a request for vid-rep1-seg3.mp4, and a request for vid-rep1-seg4.mp4) and ii) after sending the segment requests to CSS 112, sends a segment request m713 to helper 104 (i.e., a request containing the string "abcd1" in the example shown).

In one embodiment, in response to request m713, helper 104: 1) sends to the player a response m714 responsive to the request, where the response message m714 either contains the requested segment or a redirect message that causes player 102 to send a request message to a server for the segment, and 2) initiates the transmission of a prefetch request to a prefetch function (PF) 702. That is, for example, helper 104 determines whether a prefetch request to PF 702 is needed, and, if so, sends to PF 702 a prefetch request message m790 for causing PF 702 to obtain from server 108 metadata for use in playing one or more ads (or other break content) and cache the obtained metadata together with a stream identifier, which can be a single value that identifies a stream or multiple values that together identify the stream. As an example, a stream identifier can be a universally unique identifier (UUID) as defined by Request for Comment (RFC) 4122. In one embodiment, the prefetch request message m790 includes the stream identifier and i) a conventional Video Ad Serving Template (VAST) request for requesting a single ad or an ad pod (a set of one or more ads) or ii) information that enables PF 702 to generate the conventional VAST request. If the VAST request is for an ad pod, the VAST request may include a pod minimum duration attribute-value-pair (e.g., pmnd=20) and a pod maximum duration attribute attribute-value-pair (e.g., pmxd=35). In some embodiments, in addition to including the stream identifier, request message m790 includes one or more the AVPs that were included in message m202. In the embodiment shown in FIG. 7, PF 702 is separate from stitcher 106, but in other embodiments, PF 702 may be a component of stitcher 106 or stitcher 106 may be a component of PF 720. That is, in some embodiments, stitcher may perform the functionality of PF 702 or PF 702 may perform the functionality of stitcher 106.

In one embodiment, the helper determines whether a prefetch request to PF 702 is needed by checking whether a prefetch flag is set to TRUE (e.g., equal to 1) and if the prefetch flag is set to TRUE, then it is determined that a prefetch request to PF 702 is needed. In another embodiment, the helper determines whether a prefetch request to PF 702 is needed by checking both whether the prefetch flag is set to TRUE and whether the request m713 includes a trigger string (e.g., "trigger=1"), and if the prefetch flag is set to TRUE and request m713 includes the trigger string, then it is determined that a prefetch request to PF 702 is needed. After sending the prefetch request to PF 702, the flag is set to FALSE. The flag may be set back to TRUE after an ad break has finished. In one embodiment, after sending the prefetch request to PF 702, helper 104 sets an ad-is-needed flag is set to TRUE.

In the illustrated embodiment, request message m790 may include ad targeting properties (e.g., the "ad_params" AVP from message m202), which may include VAST request properties and/or other proprietary data, and a timeout duration, which may be set to, for example, 10 seconds or longer. In response to receiving message m790, PF 702 transmits to an ad server (e.g., ad server 108 in the example shown) a request m791 (e.g., a VAST request) for ad metadata. For example, request m791 may include the ad targeting properties that were included in prefetch request message m790 or it may include ad targeting properties that are generated by PF 702 using information from message m790.

In response to receiving request message m791, server 108 selects a single ad if the request message m791 is for a single ad or selects an ad pod if the request message m791 is for an ad pod. Server 108 may select the ad or ads using the ad targeting properties. After performing the selection, sever 108 transmits to PF 702 a response message m792 containing metadata for the selected ad or selected ad pod. In one embodiment, message m792 contains a conventional VAST response (e.g., an XML file containing, among other things, one or more media file identifiers (e.g., one or more Uniform Resource Locators each pointing to a different media file for an ad)).

In one embodiment, after receiving the response message m792 from server 108, PF 702 caches (i.e., stores in a data storage unit) the metadata (e.g., XML file) included in the message m792 such that the stored metadata is associated with the stream identifier so that, at a later point in time, given the stream identifier, PF 702 can retrieve the metadata from storage.

In another embodiment, after receiving the response message m792 from server 108, PF 702 determines, based on the metadata, whether the ad(s) selected by ad server 108 are satisfactory (i.e., whether the ads satisfy one or more criterions). If the ads are satisfactory, then PF 702 caches the metadata such that the stored metadata is associated with the stream identifier so that, at a later point in time, given the stream identifier, PF 702 can retrieve the metadata from storage. If, however, the metadata is not satisfactory and if sufficient time remains, PF 702 re-sends message m791 to ad server 108 to trigger ad server 108 to select a new, second set of ads and transmit to PF 702 a response message comprising new metadata for the new set of ads. In some embodiments, rather than resending only message m791, PF 702 resends message m791 with additional properties (e.g., additional AVPs), which may identify the set of previously chosen ads and/or new targeting criterion which the ad server 108 may use to select more suitable ads. Assuming the new set of ads is satisfactory, then PF 702 caches the new metadata. Alternatively, if some combination of the new set of ads and the original set of ads is better than the new set of ads and the original set of ads, then PF 702 may produce metadata using the first metadata and the second metadata. For example, if the first received metadata identifies the following ads: Ad1, Ad2, and Ad3, and the second set (new set) of metadata identifies the following ads: Ad4, Ad5, and Ad6, and the following set of ads is the most optimal set: Ad2, Ad5, and Ad6, then PF 702 may produce a new metadata file that includes the metadata for Ad2 from the first metadata and the metadata for ads Ad5 and Ad5 from the new metadata. In yet another embodiment, PF 702 may send request message m791 multiple times, with potential variations to the supplied AVP(s), to ad server 108 so that PF 702 can select the most optimal set of ads and cache metadata for this optimal ad set.

At a later point in time, helper 104 receives from player 102 a segment request m716 (i.e., a request containing the string "abcd3" in the example shown).

In one embodiment, in response to segment request m716, the helper: 1) sends to the player a response m717 responsive to the request, where the response message m717 either contains the requested segment or a redirect message that causes player 102 to send a request message to a server for the segment and 2) initiates the transmission of a request m718 (e.g., an HTTP GET request) to stitcher 106 (e.g., the helper determines whether a request m718 to stitcher 106 is needed, and, if so, sends to stitcher request message m718 indicating that helper is requesting one or more ads (e.g., an ad pod) to fill an ad break of a specified duration). In one embodiment, the request message m718 includes the same stream identifier that was included in the prefetch request message m790. In some embodiments, in addition to including the stream identifier, request message m718 includes AVPs that were included in message m202 (e.g., the "ad_params" AVP), which may, as an example, be sent as a combination of HTTP headers, URL query parameters, or HTTP POST body data. That is, for example, stitcher 106 may include an HTTP server.

In one embodiment, the helper determines whether a request m718 to stitcher 106 is needed by checking whether an 'ad-is-needed flag' is set to TRUE (e.g., equal to 1) and if the ad-is-needed flag is set to TRUE, then it is determined that a request to stitcher 106 is needed. In another embodiment, the helper determines whether a request to stitcher 106 is needed by checking both whether the ad-is-needed flag is set to TRUE and whether the request m716 includes a trigger string (e.g., "trigger=1"), and if the ad-is-needed flag is set to TRUE and request includes the trigger string, then it is determined that a request to stitcher 106 is needed. After sending the request, the ad-is-needed flag is set to FALSE. The ad-is-needed flag may be set back to TRUE after the ad break has finished.

In this example, stitcher 106 responds to request m718 by transmitting to PF 702 a request m794 for metadata (such as a VAST response) for use in playing one or more ads (or other break content). Request m794 includes the stream identifier.

In response to receiving request message m794, PF 702 uses the stream identifier to determine whether the metadata cache includes metadata (e.g., a VAST XML file) associated with the stream identifier and, if so, retrieves the metadata from the cache and sends to stitcher a response message m798 containing the retrieved metadata. If, however, the metadata cache does not include metadata associated with the stream identifier, then PF 702 may 1) transmit a VAST request m796 to server 108 and receive from server 108 a VAST response m797 and include in message m798 the content of the VAST response m797 or 2) send to stitcher 106 a redirect message for causing stitcher 106 to send message m794 to ad server 108.

After receiving response message m798 from PF 702, stitcher 106 transmits to helper 104 a response message m720 that contains a manifest containing segment locator information (e.g., segment URLs and/or template information enabling helper to produce segment URLs) for retrieving the segments of the one or more ads selected by server 108 in response to the request m791 or m796 from PF 702. For instance, the manifest returned by stitcher 106 may include a first period element containing segment URLs (or corresponding template information) for the first ad and a second period element containing segment URLs (or corresponding template information) for the second ad.

After receiving response message m720, helper 104 may perform the steps described above with respect to either FIG. 2 or FIG. 4.

The description above illustrates an embodiment in which there is a single ad server (i.e., ad server 108). In other embodiments, there may be any number of available ad servers. In such an embodiment, PF 702 may be configured such that, in response to receiving the prefetch request message m790, PF 702 selects one or more of the available ad servers and then sends message m791 (or similar message) to each one of the selected ad servers.

The selection of the ad server(s) may be based on information included in message m790. For instance, message m790 may include an AVP that identifies a specific one or more of the available ad servers and PF 702 may be configured to select the identified ad server(s).

In another embodiment, when there are multiple ad servers to choose from, PF 702 may be configured to select an ad server in response to a prefetch request based on predefined configuration information. For example, considering a scenario where there are two available ad servers (ADS1 and ADS2), the pre-defined configuration information may specify that ADS1 should be selected 30% of the time and ADS2 be selected 70% of the time. For instance, given this 30/70 split between ADS1 and ADS2, if PF 702 is expected to receive 100 prefetch requests per window of time (e.g., 100 per day), then, during such a window of time, PF 702 may select ADS1 30 times in a row and then cease selecting ADS1 until PF 702 has selected ADS2 at least 70 times. That is, for example, PF 702 may be configured to front-load requests to ADS1 before sending requests to ADS2. In one embodiment, PF 702 may select ADS1 and ADS2 in round-robin or other similar rotation, ensuring a constant configured distribution to each ad server.

In one embodiment, if PF 702 selects more than one ad server and sends to each selected ad server the message m791, then PF 702 will select one of the response message m792 to cache. That is, for example, if two or more ad servers are selected and two or more of the ad servers select an ad pod and provide to PF 702 metadata for the respective selected ad pod, PF 702 may compare the ad pods to determine which is the most valuable and then cache only the metadata for the most valuable ad pod. As another example, if two or more ad servers are selected and two or more of the ad servers select an ad pod and provide to PF 702 metadata for the respective selected ad pod, PF 702 may generate an ad pod by selecting one more ads from two or more of the selected ad pods and then cache metadata corresponding to the generated ad pod. That is, if some combination of the selected ad pods is better than any one of the selected ad pods, then PF 702 may produce metadata using the metadata received from each of the two or more ad servers.

Figure 11:
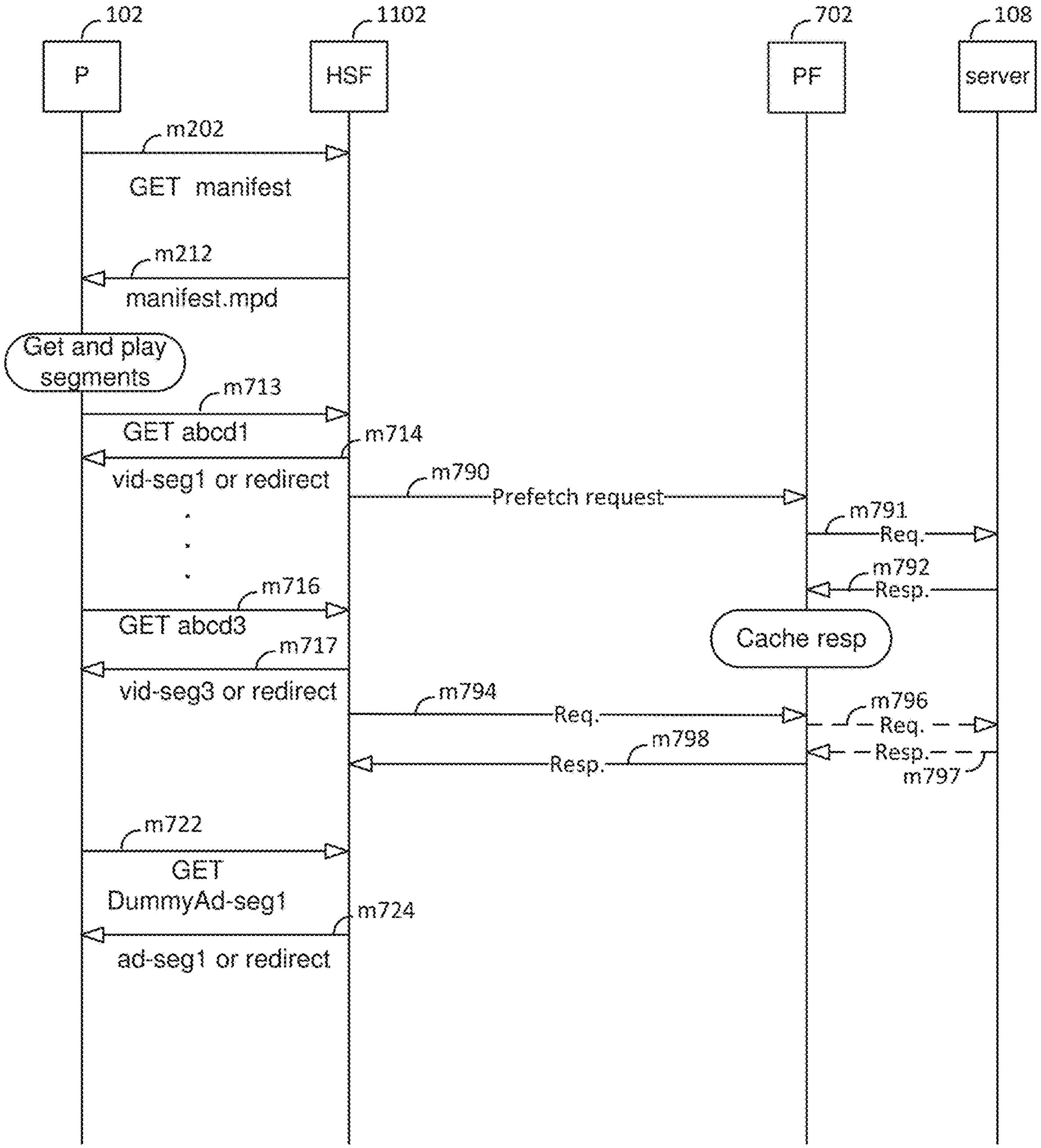
FIG. 11 is a message flow diagram according to an embodiment.

FIG. 11 is a message flow diagram illustrating a process according to another prefetching use case. In this use case a single function 1102, called the helper-stitcher function (HSF) 1102, replaces helper 104 and stitcher 106. The process may begin with player 102 sending request message m202, as described above. Request message m202 is received at HSF 1102. After receiving request message m202, HSF 1102 provides to player 102 message m212.

After player 102 receives message m221, player 102, as described above, begins sending segment requests according to the manifest, such as segment request m713, which is received at HSF 1102.

In one embodiment, in response to request m713, HSF 1102: 1) sends to the player response m714 and 2) initiates the transmission of a prefetch request to a prefetch function (PF) 702. That is, for example, HSF 1102, like helper 104, determines whether a prefetch request to PF 702 is needed, and, if so, sends to PF 702 the prefetch request message m790 for causing PF 702 to obtain from server 108 metadata for use in playing one or more ads (or other break content). At a later point in time, HSF 1102 receives from player 102 a segment request m716 (i.e., a request containing the string "abcd3" in the example shown).

In one embodiment, in response to segment request m716, the HSF: 1) sends to the player the response m717 and 2) initiates the transmission of the request m794 to PF 702 (e.g., the HSF determines whether a request m794 to PF 702 is needed, and, if so, sends to PF 702 request message m794. As described above, in response to receiving request message m794, PF 702 uses the stream identifier to determine whether the metadata cache includes metadata (e.g., a VAST XML file) associated with the stream identifier and, if so, retrieves the metadata from the cache and sends to HSF 1102 the response message m798 containing the retrieved metadata. If, however, the metadata cache does not include metadata associated with the stream identifier, then PF 702 may 1) transmit the VAST request m796 to server 108 and receive from server 108 the VAST response m797 and include in message m798 the content of the VAST response m797 or 2) send to HSF 1102 a redirect message for causing HSF 1102 to send message m794 to ad server 108.

After receiving response message m798 from PF 702, HSF 1102 obtains (e.g., generates) segment locator information (e.g., segment URLs and/or template information enabling HSF to produce segment URLs) for retrieving the segments of the one or more ads selected by server 108 in response to the request m791 or m796 from PF 702. After receiving response message m798, HSF 1102 may perform the steps described above with respect to either FIG. 2 or FIG. 4.

Figure 12:
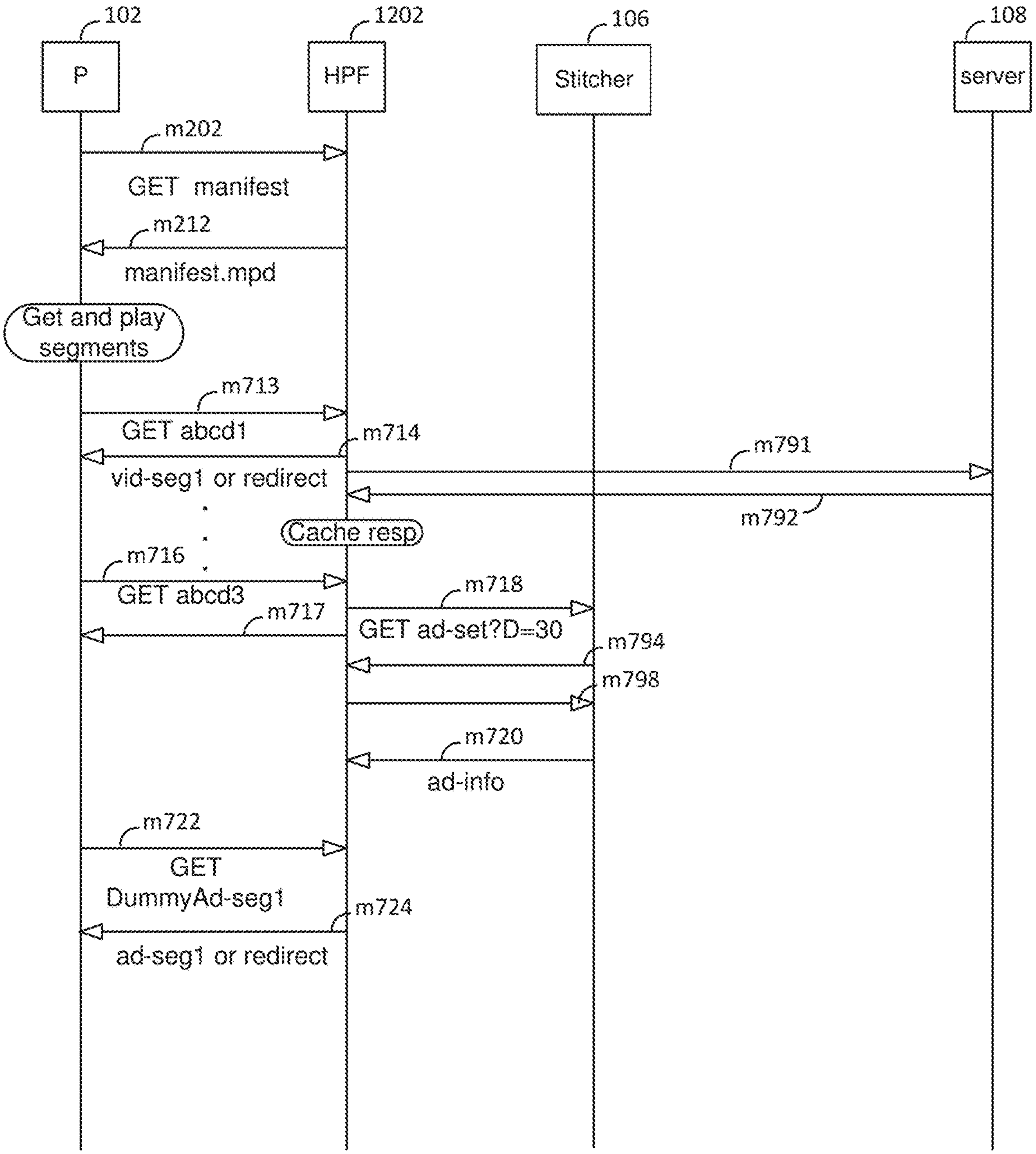
FIG. 12 is a message flow diagram according to an embodiment.

FIG. 12 is a message flow diagram illustrating a process according to another prefetching use case. In this use case a single function 1202, called the helper-prefetch function (HPF) 1202, replaces helper 104 and PF 702. The process may begin with player 102 sending request message m202, as described above. Request message m202 is received at HPF 1202. After receiving request message m202, HPF 1202 provides to player 102 message m212, described above.

After player 102 receives message m212, player 102, as described above, begins sending segment requests, such as segment request m713, which is received at HPF 1202.

In one embodiment, in response to request m713, HPF 1202: 1) sends to the player response m714 responsive to the request and 2) initiates the transmission of request m791 to server 108. That is, for example, HPF 1202, like helper 104, determines whether a request is needed, and, if so, sends to server 108 message m791 for obtaining from server 108 metadata for use in playing one or more ads (or other break content).

In response to receiving request message m791, server 108 functions as described above with respect to FIG. 7 and transmits a response message m792, which is received at HPF 1202. Message m792, as noted above, contains metadata for the selected ad or selected ad pod.

After received message m792, HPF 1202 performs the same steps as described above with respect to PF 702. For example, in one embodiment, after receiving the response message m792 from server 108, HPF 1202 caches the metadata included in the message m792 such that the stored metadata is associated with the stream identifier so that, at a later point in time, given the stream identifier, HPF 1202 can retrieve the metadata from storage. And in another embodiment, HPF 1202, among the other steps described above, determines, based on the metadata, whether the ad(s) selected by ad server 108 are satisfactory.

At a later point in time, HPF 1202 receives from player 102 a segment request m716 (i.e., a request containing the string "abcd3" in the example shown). In response to segment request m716, HPF 1202 functions in the same manner as helper 104, i.e., HPF 1202 sends to the player response m717 and initiates the transmission of request m718 to stitcher 106.

In this example, stitcher 106 responds to request m718 by transmitting to HPF 1202 a request m794 for metadata (such as a VAST response) for use in playing one or more ads (or other break content). Request m794 includes the stream identifier.

In response to receiving request message m794, HPF 1202 uses the stream identifier to determine whether the metadata cache includes metadata (e.g., a VAST XML file) associated with the stream identifier and, if so, retrieves the metadata from the cache and sends to stitcher a response message m798 containing the retrieved metadata. If, however, the metadata cache does not include metadata associated with the stream identifier, then HPF 1202 may 1) transmit a VAST request to server 108 and receive from server 108 a VAST response and include in message m798 the content of the VAST response or 2) send to stitcher 106 a redirect message for causing stitcher 106 to send message m794 to ad server 108.

After receiving response message m798 from HPF 1202, stitcher 106 transmits to HPF 1202 a response message m720 that contains a manifest containing segment locator information (e.g., segment URLs and/or template information enabling helper to produce segment URLs) for retrieving the segments of the one or more ads selected by server 108 in response to the request m791 or m796. For instance, the manifest returned by stitcher 106 may include a first period element containing segment URLs (or corresponding template information) for the first ad and a second period element containing segment URLs (or corresponding template information) for the second ad. After receiving response message m720, HPF 1202 may perform the steps described above with respect to either FIG. 2 or FIG. 4.

Figure 8:
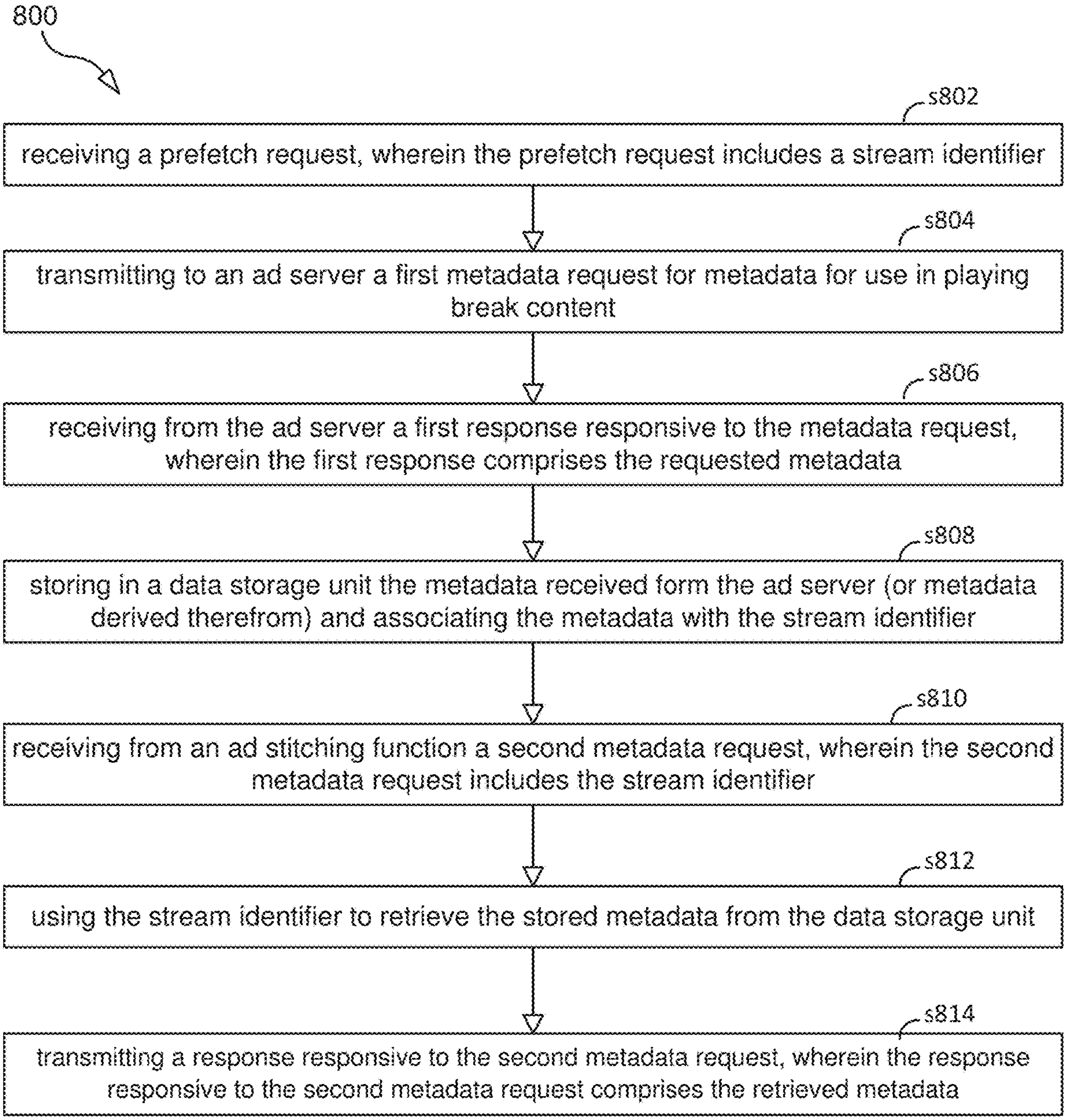
FIG. 8 is a flowchart illustrating a process according to an embodiment.

FIG. 8 is a flowchart illustrating a process 800 that includes: a prefetching function (PF) receiving (step s802) a prefetch request transmitted by a helper, wherein the prefetch request includes a stream identifier; after receiving the prefetch request, the PF transmitting (step s804) to an ad server a first metadata request for metadata for use in playing break content (e.g., one or more ads); the PF receiving (step s806) from the ad server a first response responsive to the metadata request, wherein the first response comprises the requested metadata; the PF storing (step s808) in a data storage unit the metadata received form the ad server (or metadata derived therefrom) and associating the metadata with the stream identifier; after storing the metadata, the PF receiving (step s810) from an ad stitching function a second metadata request, wherein the second metadata request includes the stream identifier; in response to receiving the second metadata request, the PF using (step s812) the stream identifier to retrieve the stored metadata from the data storage unit; and the PF transmitting (step s814) a response responsive to the second metadata request, wherein the response responsive to the second metadata request comprises the retrieved metadata.

Figure 9:
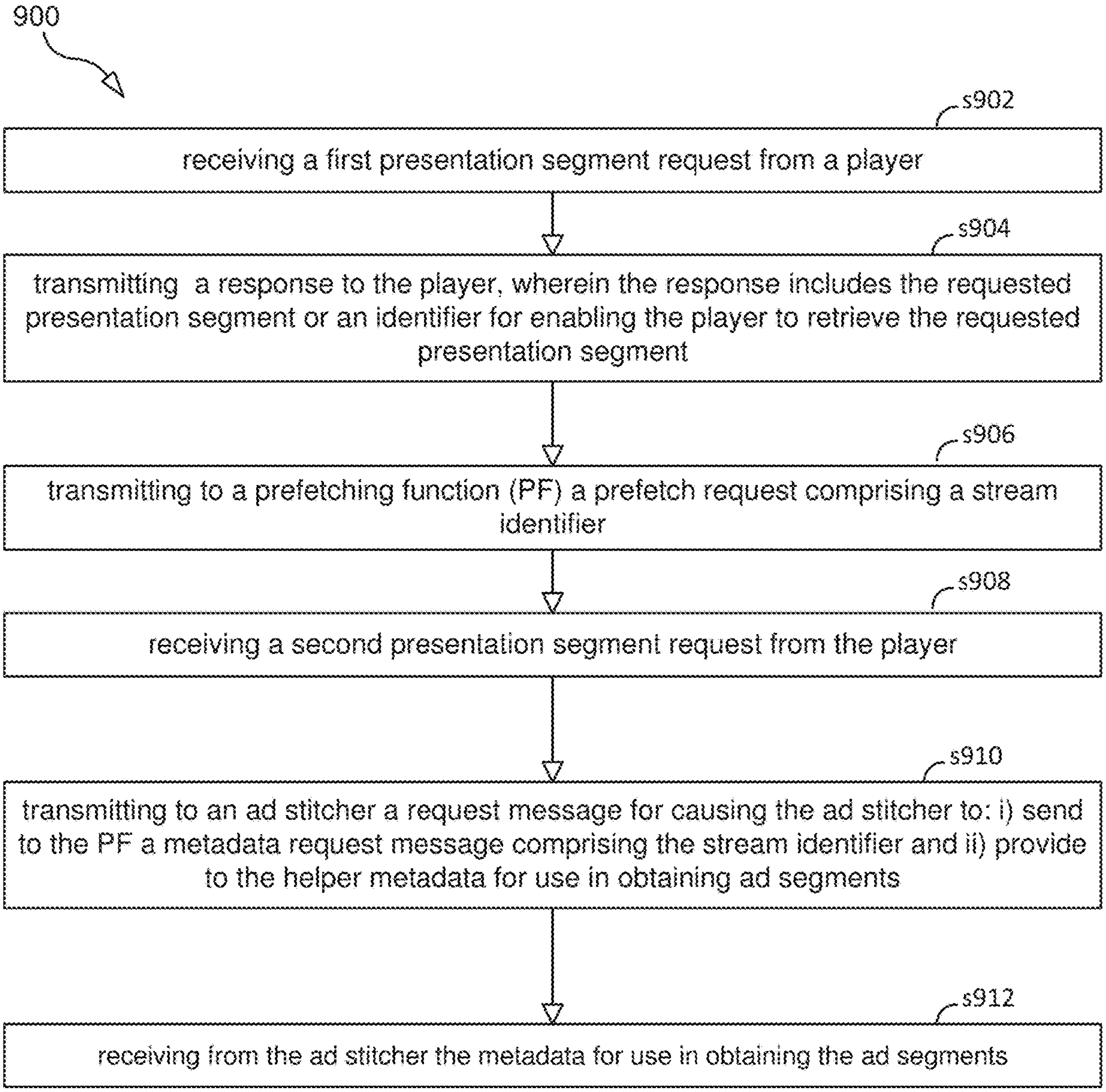
FIG. 9 is a flowchart illustrating a process according to an embodiment.

FIG. 9 is a flowchart illustrating a process 900 that includes: a helper receiving (step s902) a first presentation segment request from a player; in response to receiving the first presentation segment request, the helper: i) transmitting (step s904) a response to the player, wherein the response includes the requested presentation segment or an identifier for enabling the player to retrieve the requested presentation segment and ii) transmitting (step s906) to a prefetching function (PF) a prefetch request comprising a stream identifier; the helper receiving (step s908) a second presentation segment request from the player; in response to receiving the second presentation segment request, the helper transmitting (step s910) to an ad stitcher a request message for causing the ad stitcher to: i) send to the PF a metadata request message comprising the stream identifier and ii) provide to the helper metadata for use in obtaining ad segments; and the helper receiving (step s912) from the ad stitcher the metadata for use in obtaining the ad segments.

Figure 10:
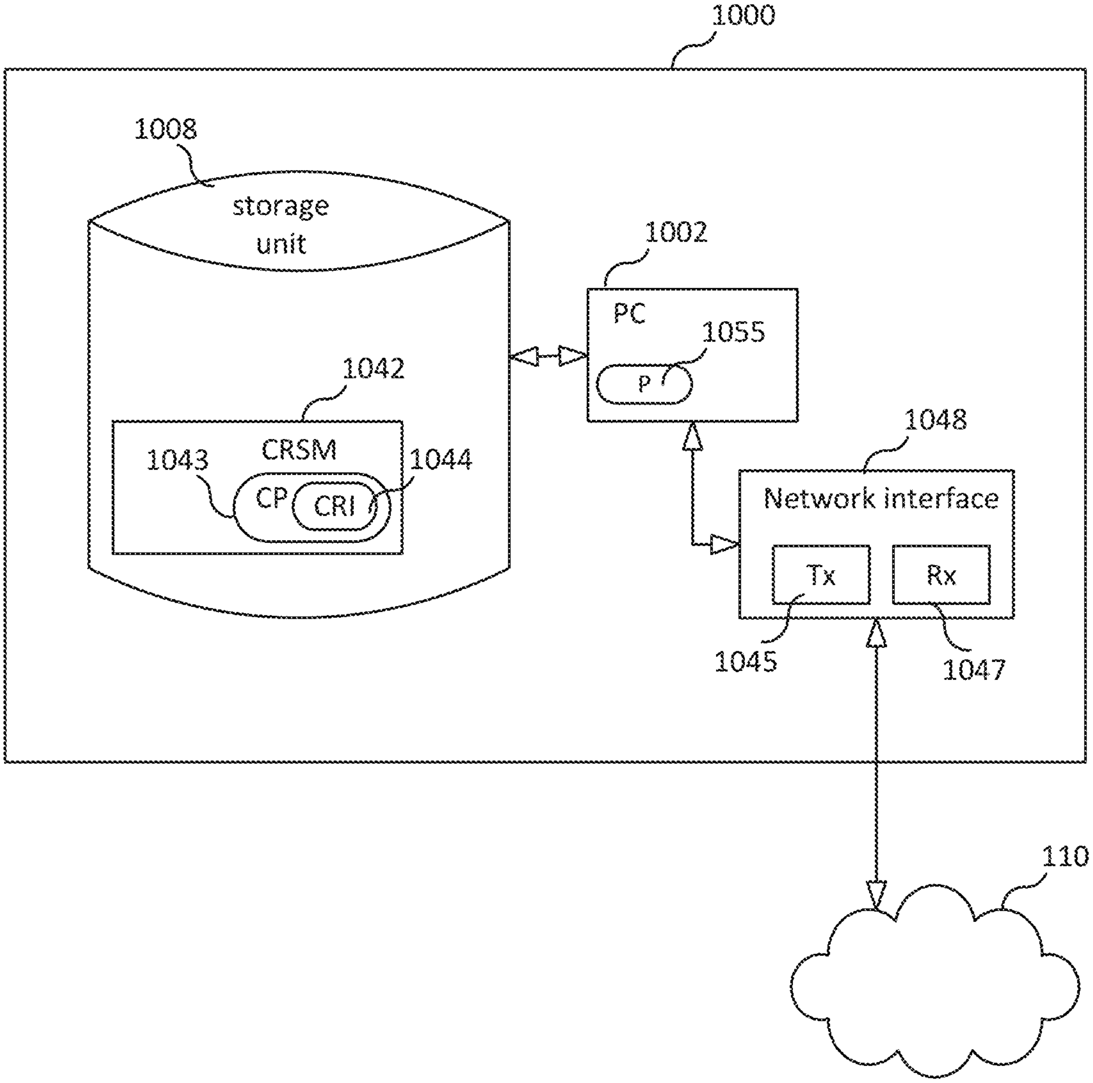
FIG. 10 is a block diagram an apparatus according to an embodiment.

FIG. 10 is a block diagram of apparatus 1000, according to some embodiments, that may implement helper 104. In some embodiments, apparatus 1000 (or a component thereof) may be a component of device 120. As shown in FIG. 10, apparatus 1000 may comprise: processing circuitry (PC) 1002, which may include one or more processors (P) 1055 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (e.g., apparatus 1000 may be a distributed computing apparatus comprising two or more computers or a single computer); at least one network interface 1048 (e.g., a physical interface or air interface) comprising a transmitter (Tx) 1045 and a receiver (Rx) 1047 for enabling apparatus 1000 to transmit data to and receive data from other network nodes connected to network 110 (e.g., an Internet Protocol (IP) network) to which network interface 1048 is connected (physically or wirelessly) (e.g., network interface 1048 may be coupled to an antenna arrangement comprising one or more antennas for enabling apparatus 1000 to wirelessly transmit/receive data); and a storage unit (a.k.a., "data storage system") 1008, which may include one or more non-volatile storage devices and/or one or more volatile storage devices. In embodiments where PC 1002 includes a programmable processor, a computer readable storage medium (CRSM) 1042 may be provided. CRSM 1042 may store a computer program (CP) 1043 comprising computer readable instructions (CRI) 1044. CRSM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes apparatus 1000 to perform steps described herein (e.g., steps described herein with reference to the flowcharts). In other embodiments, apparatus 1000 may be configured to perform steps described herein without the need for code. That is, for example, PC 1002 may consist merely of one or more ASICs. Hence, the features of the embodiments described herein may be implemented in hardware and/or software.

Summary of Various Embodiments

A1. A method comprising: providing a manifest to a player, wherein the manifest comprises a segment identifier for identifying a segment of first media content or template information for generating the segment identifier; receiving, from the player, a first segment request m713 comprising the segment identifier for identifying the segment of first media content; and in response to receiving the first segment request: i) providing to the player a first response message m714 responsive to the first segment request m713; and ii) performing a first process for enabling the player to obtain second media content to be played by the player during a break in the first media content, wherein the first process for enabling the player to obtain the second media content comprises transmitting to a prefetching function (PF) a prefetch request m790 for triggering the PF to send to an ad server a metadata request m791, wherein the ad server responds to the metadata request by providing to the PF metadata for the second media content.

A2. The method of embodiment A1, wherein the method further comprises: receiving, from the player, a second segment request m716 comprising a second segment identifier; and in response to receiving the second segment request m716: i) providing to the player a second response message m717 responsive to the second segment request m716; and ii) initiating a transmission of a request m794 to the PF, wherein the PF responds to the request (m794 by providing the metadata for the second media content.

A3. The method of embodiment A2, wherein initiating the transmission of the request m794 to the PF comprises transmitting to an ad stitcher a message m718 triggering the ad stitcher to send the request to the PF.

A4. The method of embodiment A3, wherein the method further comprises: after transmitting the message m718 to the ad stitcher, receiving from the ad stitcher a response m720 responsive to the message m718, wherein the response m720 comprises segment locator information for retrieving segments of the second media content.

A5. The method of embodiment A4, wherein the segment locator information for retrieving segments of the second media content comprises a segment identifier identifying a segment of the second media content, and the method further comprises: after providing to the player the second response message m717 responsive to the second segment request m716, receiving from the player a third segment request m722; and in response to receiving the third segment request m722, performing a second process that includes providing to the player i) the segment identifier identifying the segment of the second media content or ii) the segment of the second media content.

A6. The method of embodiment A2, wherein the method further comprises: after providing to the player the second response message m717 responsive to the second segment request m716, receiving from the player a third segment request m722; and in response to receiving the third segment request m722, performing a second process that includes providing to the player i) a segment identifier identifying a segment of the second media content or ii) the segment of the second media content.

A7. The method of embodiment A6, wherein the method further comprises, prior to receiving from the player the third segment request m722, mapping an identifier to the segment identifier identifying the segment of the second media content, the third segment request m722 comprises the identifier mapped to the segment identifier identifying the segment of the second media content, and the second process further comprises, using the identifier included in the third segment request m722 to retrieve the segment identifier identifying the segment of the second media content.

A8. The method of embodiment A1, wherein the first process further comprises, prior to transmitting the prefetch request m790 to the PF, determining whether the first segment request m713 comprises a trigger string, and the step of transmitting the prefetch request m790 to the PF is performed as a result of determining that the first segment request m713 comprises a trigger string.

A9. The method of embodiment A1, wherein the manifest provided to the player includes an ordered list of N segment locators, each one of the first M segment locators included in the ordered list includes a first sever identifier, where $M>0$ and $M<N$, each one of the $N-M$ segment locators in the ordered list that follow the first M segment locators in the ordered list includes: i) a second server identifier that is different than the first server identifier and ii) a unique string.

A10. The method of embodiment A9, wherein the first process further comprises, prior to transmitting the prefetch request m790 to the PF, determining, based on the value of a variable, whether a prefetch is needed, and the step of transmitting the prefetch request m790 to the PF is performed as a result of determining that a prefetch is needed.

B1. A method, the method comprising: receiving a first segment request m713 from a player; in response to receiving the first segment request: i) transmitting a first response m714 to the player, wherein the first response includes a first segment of first media content or a first segment identifier for enabling the player to retrieve the first segment of the first media content; and ii) transmitting to a prefetching function (PF) a prefetch request comprising a stream identifier; receiving a second segment request m716 from the player; and in response to receiving the second segment request m716: i) transmitting a second response m717 to the player, wherein the second response includes a second segment of the first media content or a second segment identifier for enabling the player to retrieve the second segment of the first media content; and ii) performing a process for obtaining segment locator information for use in retrieving segments of second media content.

B2. The method of embodiment B1, wherein performing the process for obtaining the segment locator information comprises: transmitting to a server (e.g., stitcher 106) a request message m718 for causing the server to: i) send to the PF a metadata request message m794 comprising the stream identifier and ii) provide the segment locator information; and receiving from the server a response message m720 comprising the segment locator information.

B3. The method of embodiment B1, wherein performing the process for obtaining the segment locator information comprises: transmitting to the PF a metadata request message m794 comprising the stream identifier; receiving from the PF a response message m798 responsive to the metadata request message; and obtaining the segment locator information using metadata included in the response message from the PF.

B4. The method of embodiment B3, wherein obtaining the segment locator information using metadata included in the response message from the PF comprises: retrieving the second media content using information included in the metadata included in the response message from the PF; segmenting the second media content into a set of N segments, N>1; and generating the segment locator information.

B5. The method of embodiment B4, wherein the segment locator information comprises, for each one of the N segments, a unique identifier associated with the segment.

C1. A method, the method comprising: receiving a first segment request m713 from a player; in response to receiving the first segment request: i) transmitting a first response m714 to the player, wherein the first response includes a first segment of first media content or a first segment identifier for enabling the player to retrieve the first segment of the first media content; and ii) transmitting to an ad server a first metadata request m791; receiving from the ad server a first metadata response m792 responsive to the first metadata request, wherein the first metadata response m792 comprises metadata for second media content; caching the metadata; receiving a second segment request m716 from the player; and in response to receiving the second segment request m716: i) transmitting a second response m717 to the player, wherein the second response includes a second segment of the first media content or a second segment identifier for enabling the player to retrieve the second segment of the first media content; and ii) performing a process for obtaining segment locator information for use in retrieving segments of the second media content.

C2. The method of claim C1, wherein performing the process for obtaining the segment locator information comprises: transmitting to a server (e.g., stitcher 106) a second metadata request m718 for causing the server to send a third metadata request m794; and receiving the third metadata request m794; in response to receiving the third metadata request m794, transmitting to the server a third metadata response m798 comprising the cached metadata; after transmitting the third metadata response m798, receiving from the server a second metadata response m720 responsive to the second metadata request, wherein second metadata response m720 comprises the segment locator information.

D1. A method, the method comprising: the PF receiving a prefetch request (e.g., m790, wherein the prefetch request includes a stream identifier; after receiving the prefetch request, the PF transmitting to a server a first metadata request m791 for metadata for use in playing break content; the PF receiving from the server a first response m792 responsive to the metadata request, wherein the first response comprises the requested metadata; the PF storing in a data storage unit the received metadata or derived metadata derived from the received metadata, and associating the received or derived metadata with the stream identifier; after storing the metadata, the PF receiving a second metadata request m794, wherein the second metadata request includes the stream identifier; in response to receiving the second metadata request, the PF using the stream identifier to retrieve the stored metadata from the data storage unit; and the PF transmitting a response m798 responsive to the second metadata request, wherein the response comprises the metadata retrieved from the data storage unit.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

As used herein transmitting a message "to" or "toward" an intended recipient encompasses transmitting the message directly to the intended recipient or transmitting the message indirectly to the intended recipient (i.e., one or more other nodes are used to relay the message from the source node to the intended recipient). Likewise, as used herein receiving a message "from" a sender encompasses receiving the message directly from the sender or indirectly from the sender (i.e., one or more nodes are used to relay the message from the sender to the receiving node). Further, as used herein "a" means "at least one" or "one or more."

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

Further, while all of the examples used herein show each segment being contained in its own file, this was done solely for the sake of illustration. For example, it is known in the art that each segment for a given representation can be stored in the same file and the player requests a particular segment by transmitting to the server not only the identifier for the file but also the identifier (e.g., byte offset) for the segment within the file.

The invention claimed is:

1. A method comprising:

providing a manifest to a player, wherein i) the manifest comprises a first segment identifier for identifying a first segment of first media content, or ii) the manifest comprises template information for generating a first segment identifier for identifying the first segment of the first media content;

receiving, from the player, a first segment request comprising the first segment identifier for identifying the segment of first media content; and in response to receiving the first segment request:

i) providing to the player a first response message responsive to the first segment request; and ii) performing a first process for enabling the player to obtain second media content to be played by the player during a break in the first media content, wherein the first process for enabling the player to obtain the second media content comprises transmitting to a prefetching function (PF) a prefetch request for triggering the PF to send to an ad server a metadata request, wherein the ad server responds to the metadata request by providing to the PF metadata for the second media content, the method further comprises:

receiving, from the player, a second segment request comprising a second segment identifier;

in response to receiving the second segment request:

i) providing to the player a second response message responsive to the second segment request; and ii) initiating a transmission of a second metadata request to the PF, wherein the PF responds to the second metadata request by providing the metadata for the second media content;

after providing to the player the second response message responsive to the second segment request, receiving from the player a third segment request; and in response to receiving the third segment request, performing a second process that includes providing to the player i) a segment identifier identifying a segment of the second media content or ii) the segment of the second media content.

2. The method of claim 1, wherein initiating the transmission of the second metadata request to the PF comprises transmitting to an ad stitcher a message triggering the ad stitcher to send the second metadata request to the PF.

3. The method of claim 2, wherein the method further comprises:

after transmitting the message to the ad stitcher, receiving from the ad stitcher a response responsive to the message, wherein the response comprises segment locator information for retrieving segments of the second media content.

4. The method of claim 3, wherein the segment locator information for retrieving segments of the second media content comprises a segment identifier identifying a segment of the second media content, and the method further comprises:

after providing to the player the second response message responsive to the second segment request, receiving from the player a third segment request; and in response to receiving the third segment request, performing a second process that includes providing to the player i) the segment identifier identifying the segment of the second media content or ii) the segment of the second media content.

5. The method of claim 1, wherein the method further comprises, prior to receiving from the player the third segment request, mapping an identifier to the segment identifier identifying the segment of the second media content, the third segment request comprises the identifier mapped to the segment identifier identifying the segment of the second media content, and the second process further comprises, using the identifier included in the third segment request to retrieve the segment identifier identifying the segment of the second media content.

6. The method of claim 1, wherein the first process further comprises, prior to transmitting the prefetch request to the PF, determining whether the first segment request comprises a trigger string, and the step of transmitting the prefetch request to the PF is performed as a result of determining that the first segment request comprises a trigger string.

7. The method of claim 1, wherein the manifest provided to the player includes an ordered list of N segment locators, each one of the first M segment locators included in the ordered list includes a first sever identifier, where $M \geq 0$ and $M < N$, each one of the N−M segment locators in the ordered list that follow the first M segment locators in the ordered list includes: i) a second server identifier that is different than the first server identifier and ii) a unique string.

8. The method of claim 7, wherein the first process further comprises, prior to transmitting the prefetch request to the PF, determining, based on the value of a variable, whether a prefetch is needed, and the step of transmitting the prefetch request to the PF is performed as a result of determining that a prefetch is needed.

9. A method, the method comprising:

receiving a first segment request from a player;

in response to receiving the first segment request:

i) transmitting a first response to the player, wherein the first response includes a first segment of first media content or a first segment identifier for enabling the player to retrieve the first segment of the first media content; and ii) transmitting to a prefetching function (PF) a prefetch request comprising a stream identifier;

receiving a second segment request from the player; and in response to receiving the second segment request:

i) transmitting a second response to the player, wherein the second response includes a second segment of the first media content or a second segment identifier for enabling the player to retrieve the second segment of the first media content; and ii) performing a process for obtaining segment locator information for use in retrieving segments of second media content, wherein performing the process for obtaining the segment locator information for use in retrieving segments of the second media content comprises:

transmitting to a server a request message for causing the server to: i) send to the PF a metadata request message comprising the stream identifier and ii) provide the segment locator information; and receiving from the server a response message comprising the segment locator information.

10. The method of claim 9, wherein performing the process for obtaining the segment locator information comprises:

transmitting to the PF a metadata request message comprising the stream identifier;

receiving from the PF a response message responsive to the metadata request message; and obtaining the segment locator information using metadata included in the response message from the PF.

11. The method of claim 10, wherein obtaining the segment locator information using metadata included in the response message from the PF comprises:

retrieving the second media content using information included in the metadata included in the response message from the PF;

segmenting the second media content into a set of N segments, $N > 1$; and generating the segment locator information.

12. The method of claim 11, wherein the segment locator information comprises, for each one of the N segments, a unique identifier associated with the segment.

13. A method, the method comprising:

receiving a first segment request from a player;

in response to receiving the first segment request:

i) transmitting a first response to the player, wherein the first response includes a first segment of first media content or a first segment identifier for enabling the player to retrieve the first segment of the first media content; and ii) transmitting to an ad server a first metadata request;

receiving from the ad server a first metadata response responsive to the first metadata request, wherein the first metadata response comprises metadata for second media content;

caching the metadata;

receiving a second segment request from the player; and in response to receiving the second segment request:

i) transmitting a second response to the player, wherein the second response includes a second segment of the first media content or a second segment identifier for enabling the player to retrieve the second segment of the first media content; and ii) performing a process for obtaining segment locator information for use in retrieving segments of the second media content, wherein performing the process for obtaining the segment locator information for use in retrieving segments of the second media content comprises:

transmitting to a server a second metadata request for causing the server to send a third metadata request;

receiving the third metadata request;

in response to receiving the third metadata request, transmitting to the server a third metadata response comprising the cached metadata; and after transmitting the third metadata response, receiving from the server a second metadata response responsive to the second metadata request, wherein second metadata response comprises the segment locator information.

* * * * *